United States Patent [19]

Alles

[11] 4,220,990

[45] Sep. 2, 1980

[54] PERIPHERAL PROCESSOR MULTIFUNCTION TIMER FOR DATA PROCESSING SYSTEMS

[75] Inventor: Harold G. Alles, Bridgewater, N.J.

[73] Assignee: Bell Telephone Laboratories, Incorporated, Murray Hill, N.J.

[21] Appl. No.: 945,078

[22] Filed: Sep. 25, 1978

[51] Int. Cl.² .............................................. G06F 9/18
[52] U.S. Cl. .................................................... 364/200
[58] Field of Search ................................ 364/200, 900

[56] References Cited

U.S. PATENT DOCUMENTS

| | | | |
|---|---|---|---|
| 2,957,945 | 10/1960 | Packard | 179/15 |
| 3,333,252 | 7/1967 | Shimabukuro | 364/200 |
| 3,633,181 | 1/1972 | Sikorsky | 364/300 |
| 3,891,973 | 6/1975 | Maxwell | 364/900 |
| 3,947,824 | 3/1976 | Doehle et al. | 364/900 |
| 4,016,541 | 4/1977 | Delagi et al. | 364/200 |
| 4,090,239 | 5/1978 | Twibell et al. | 364/200 |
| 4,099,232 | 7/1978 | Mensch, Jr. | 364/200 |

OTHER PUBLICATIONS

Haur et al., "Organization of the No. 1 ESS Stored Program", *Bell System Technical Journal,* Sep. 1964, pp. 1870–1872, 1927–1929 & 1950–1952.

*Primary Examiner*—David H. Malzahn
*Attorney, Agent, or Firm*—Charles S. Phelan

[57] ABSTRACT

A peripheral processor (13) and associated memory (21) cooperate with a main processor (10) in a data processing system to provide for the main processor multiple parallel timing channels (7) for timing functions of various durations in an extensive range of duration magnitudes. The main processor initiates the timing of an event by interrupting the peripheral processor to specify a device and the duration of its function to be timed for each such function as the need for each timing operation arises. The peripheral processor administers all of the timing channels are queues (8) time-outs as they occur and pending notification of the main processor of the time-out by an interrupt request. Such interrupt requests are generated in a predetermined order with respect to factors such as the order of occurrence of the time-out and the relative interrupt priority of the timed function.

12 Claims, 13 Drawing Figures

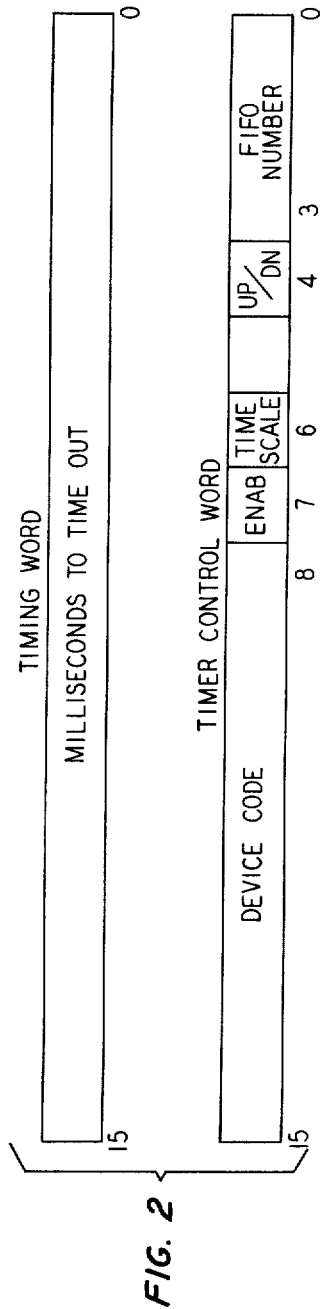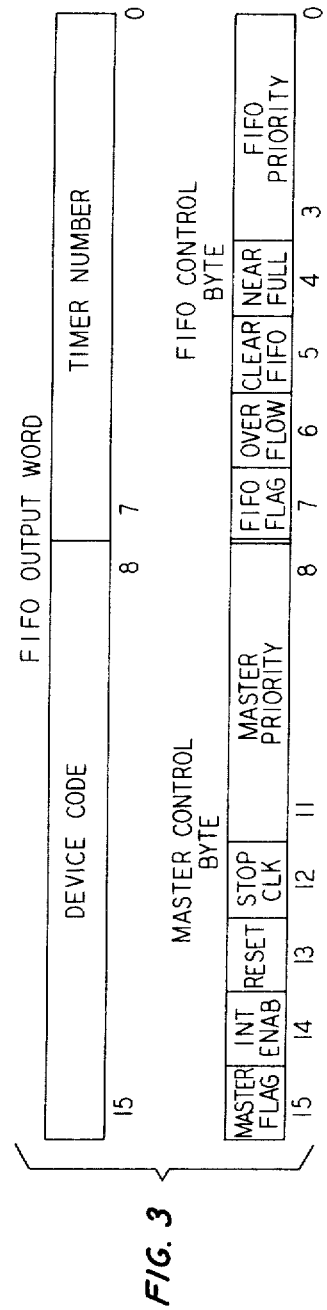
FIG. 2
FIG. 3

MP ROM BANK

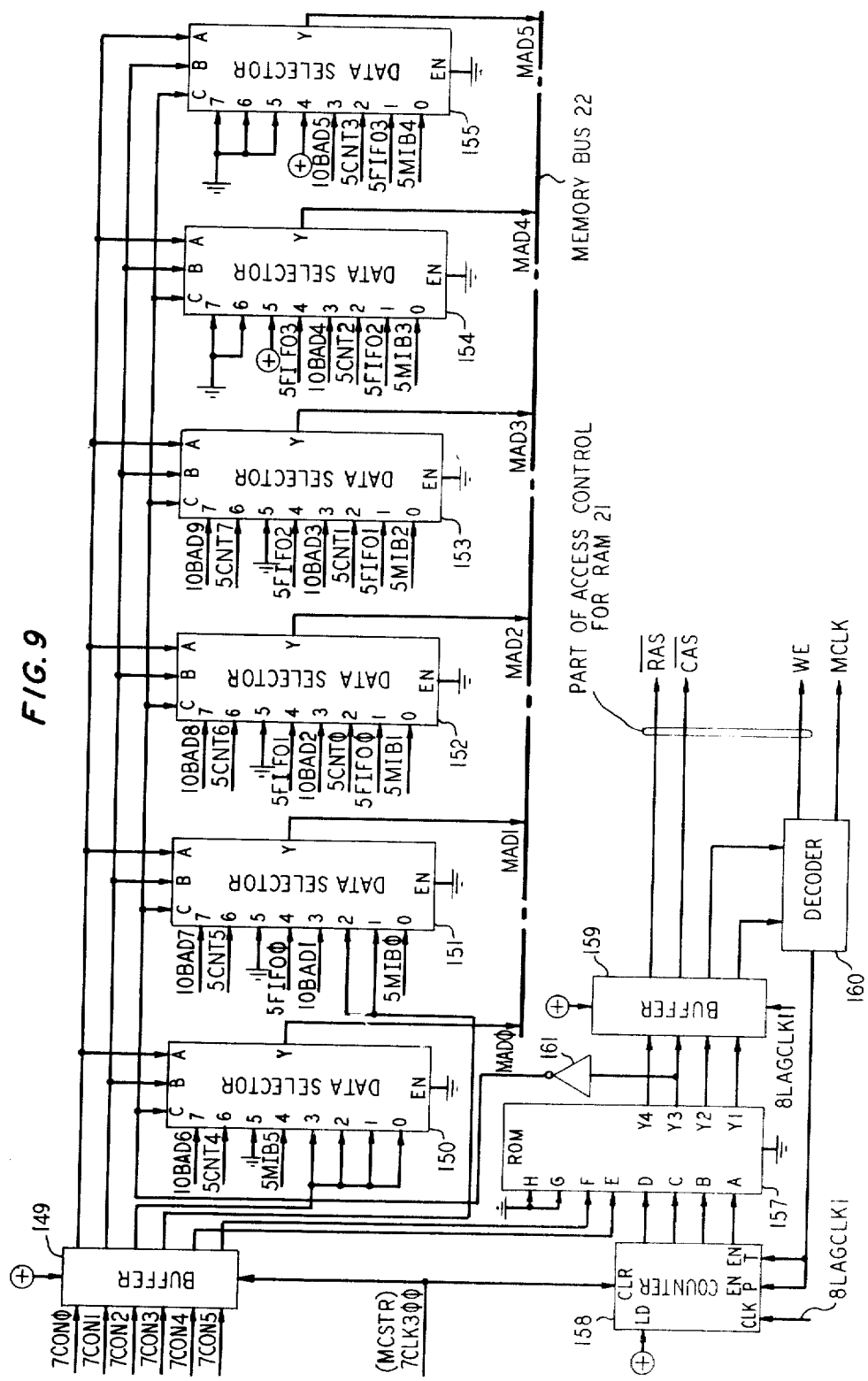

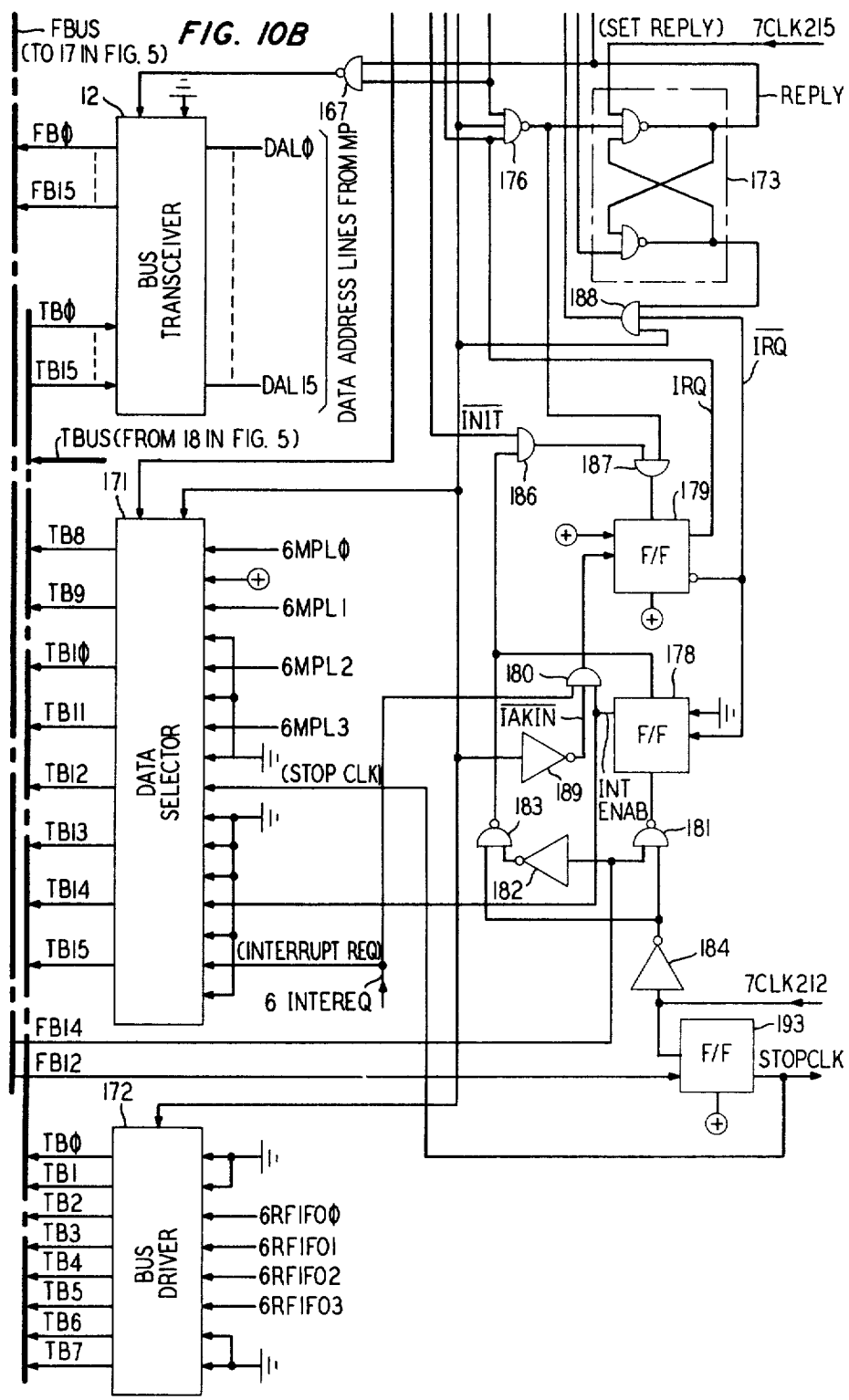

PERIPHERAL PROCESSOR MULTIFUNCTION TIMER FOR DATA PROCESSING SYSTEMS

BACKGROUND OF THE INVENTION

This invention relates to multifunction timers for use in communication system processors and the like.

Timing functions for communication system processors have been typically carried out by the system control processor itself in cooperation with its memory. Some illustrative functions that have been so timed include the timing of calls from calling telephones or the timing of the presence of a tone in a multifrequency signaling arrangement in order to distinguish other tones and noises. These functions often involve an operation in which registers in memory contain binary coded value words initially representing the interval duration to be timed. The system processor calls those words from memory in a recurring sequence, decrements the called word, and tests its value for the attainment of zero. Upon detecting the zero value, the processor's client program is notified of the need to service the timed event. One example of the latter timing technique is found in the M. F. Sikorsky U.S. Pat. No. 3,633,181.

It is also known in data processing systems for a processor to have an ordered task list from which it takes tasks according to relative priority. An example of this is the interrupt system for the No. 1 Electronic Switching System described in the September 1964 issue of the *Bell System Technical Journal.* Such an interrupt arrangement is described at pp. 1870-1872 and 1927-1929 in that issue of the Journal. However, in either case, substantial computer working time is consumed in performing the timing function calculations; and that processor time is unavailable for the performance of the primary communication system processor control functions.

It is also known in the art to associate a peripheral processor with a main processor to perform special functions to relieve the main processor for other work. Nevertheless, data processing systems continue to do event timing within, or in close dependence upon, the main processor and for a comparatively small number of events, e.g., a few tens of events in most cases, in situations where intervals are of variable size.

It is, therefore, one object of the present invention to reduce communication system control processor working time required for timing multiple device or process functions.

It is another object to improve timing operations for communication system processing functions.

A further object is to utilize a peripheral processor to administer communication system timer functions in a way which permits hundreds of such functions to be handled at substantially the same time.

SUMMARY OF THE INVENTION

The foregoing and other objects of the invention are realized in an illustrative embodiment in which a peripheral processor, cooperating with a memory, responds to timing interrupt requests from a served main processor and, in response thereto at appropriate later times, sends corresponding time-out service interrupt requests to the main processor. The peripheral processor administers multiple timing operations in parallel; and, as respective time-outs occur, it queues indications thereof in the memory. Administration of the queue is also carried out by the peripheral processor to request a main processor interrupt for each queued time-out indication, one at a time in a predetermined selection sequence.

It is one feature of the invention that, in the course of the queue administration, the time-out indications are distributed among plural sets of temporary storage registers which are grouped according to relative priorities of timed functions. The time-outs in the group of highest priority are served before all others, and within that group the time-outs are handled on a first-in-first-out (FIFO) basis.

It is another feature that the peripheral processor requires a level of capability for real-time operation according to the number of timer channels to be administered.

A further feature is that by operating on an interrupt basis for both directions of communication between processors a two-ported memory effect is realized; but the served processor is relieved of the burden of frequent memory accesses required for realizing a compact, high speed, timer capable of implementing large numbers of simultaneous timing functions.

BRIEF DESCRIPTION OF THE DRAWING

A more complete understanding of the invention and its various features, objects, and advantages may be obtained from a consideration of the following detailed description in conjunction with the appended claims and the attached drawings in which:

FIG. 2 is a memory word diagram for a timer register set utilized in the system of FIG. 1;

FIG. 3 is a memory word diagram for a temporary storage register set utilized in the system of FIG. 1;

FIG. 9 is a diagram of a multiplexor used in the embodiment of FIG. 4;

FIGS. 10A and 10B together are a diagram of processor interface logic employed for utilizing the processor of FIG. 4 in the system of FIG. 1.

DETAILED DESCRIPTION

Figure 1:
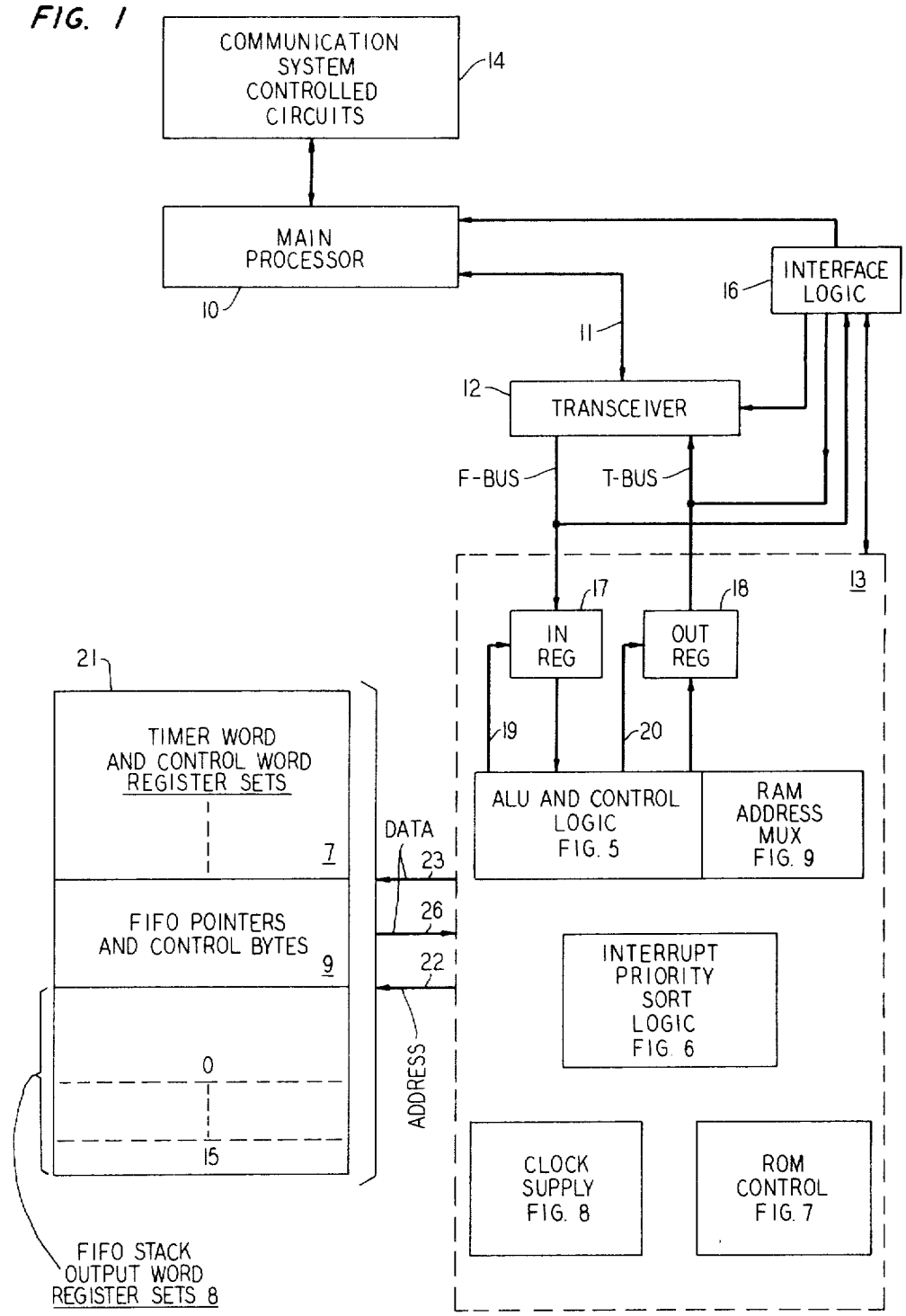
FIG. 1 is a simplified block and line diagram of the communication system control processor utilizing a timer of the present invention.

In FIG. 1 a main processor 10 for controlling communication system circuits 14 requires multiple simultaneous interval timing capabilities. The processor 10 includes, without separate illustration within its schematic representation, memory used in processing functions other than timing which are carried out by the main processor.

Since a great deal has been written on communication system functions and the timing thereof, it is sufficient to observe here that the main processor 10 is a control processor exercising control in accordance with a stored program requiring interval timing or measurement for intervals of, for example, one millisecond to about 65 seconds duration. Events to be timed are conveniently also classified according to their relative urgency, i.e., the relative priority with which the processor 10 must service them after time-out. For purposes of illustration it is herein assumed that events to be timed in the program of processor 10 fall into sixteen different priority classes without restriction on the duration of the timed intervals.

It is not necessary that the present invention be utilized in a communication system since it is useful in other data processing environments as well. One example of such an additional processing environment is its use in music synthesizers which have at least as great a need for multifunction timers of the type outlined.

In FIG. 1 a bidirectional data and address bus 11 allows the main processor 10 to send and receive bit-parallel signals with respect to a bidirectional transceiver 12 as though it were memory. The transactions are controlled in response to interface signals transmitted between the main processor 10 and a peripheral processor 13. The latter signals are transmitted between the two processors by way of a control signal path including interface logic 16. Separate buffer registers 17 and 18 in processor 13 are coupled respectively to receive signals from the transceiver 12 and send signals to that transceiver. Registers 17 and 18 are under control of enabling signals provided from arithmetic/logic unit (ALU) and control logic (to be described in connection with FIG. 5) in processor 13 by way of leads 19 and 20. The connections between the registers 17 and 18 and the transceiver 12 are hereinafter cited as the F-bus and the T-bus, respectively. Processor 13 also includes a RAM address multiplexor for addressing a memory 21, interrupt priority sort logic, a clock supply, and a read-only memory (ROM) control to be described in connection with FIGS. 9, 6, 8 and 7, respectively.

A random access memory (RAM) 21 is coupled to be controlled by the peripheral processor 13. This control is exercised by way of an address bus 22 for addressing the memory from the processor 13 and by way of unidirectional multiconductor busses 23 and 26 for sending data to the memory and receiving data from the memory. Outputs from buffer register 17 are also coupled to the sending bus 23, and can be used for holding data to be passed to RAM 21 or for holding addresses from processor 10 for accessing data in RAM 21. Inputs to the buffer register 18 are coupled to receive signals from the receiving data bus 26. It will thus be seen that the main processor 10 is unable to access RAM 21 directly, that function being reserved to peripheral processor 13. Transmissions from main processor 10 to transceiver 12 are interpreted by processor 13 as being either data or address; and, if address, it is translated from the address scheme of processor 10 to that of processor 13 and RAM 21. Consequently, future references herein to main processor 10 reading or writing, or the like, in RAM 21 are to be understood as requests to processor 13 to carry out the indicated function. For example, processor 10 can alter all or part of a word in RAM 21 by directing processor 13 to transfer the word to processor 10 where it is altered and transferred back.

Control communication between the main processor 10 and the peripheral processor 13 passes by way of the aforementioned logic 16 in accordance with well-known interprocessor communication techniques. Such interprocessor communications allow each processor, e.g., to request an interrupt at the other and acknowledge that an interrupt request has been received. The transceiver 12 and registers 17 and 18 serve somewhat as mailboxes for associated data messages.

Summarizing the operation of FIG. 1 before considering details of a map of RAM 21 and details of specific hardware implementations, the multifunction timing burden is primarily imposed on peripheral processor 13 and its cooperation with RAM 21. Main processor 10 requests an interrupt in peripheral processor 13 to initiate timing of an event, receives time-out information at an appropriate later time in the form of an interrupt request from processor 13, and supplies data from time to time. Processor 10 maintains its own record of which timers are in use for each priority level of services to be timed. Accordingly, a timing initiation request from processor 10 includes a timer number which is used by processor 13 to access RAM 21. Processor 13 accesses the specified timer in RAM 21 to load it initially; and thereafter it periodically changes the state of the timer, detects a predetermined timer state to produce a time-out indication, queues those indications for all active timers in register stacks in RAM 21 according to relative priority with which main processor 10 should service the respective time-outs, and returns time-out interrupt requests to processor 10 for the queued time-outs in accordance with those priorities.

The organization of the contents of the RAM 21 is generally shown in FIG. 1 in regard to the portions thereof which are of particular interest in connection with the multichannel timer of the present invention. The RAM illustratively employed is organized on an 8-bit word basis, but the stored data is advantageously organized on a 16-bit word basis. A first sector of memory contains plural register sets 7, each set including a 16-bit timing word (event duration) and a 16-bit timer control word indicating various pieces of information needed in connection with the use of the associated timing word. These words are advantageously located in adjacent, word locations at two-location intervals for 256 illustrative timing channels numbered 0 through 255 in decimal.

A second sector of the memory 21 includes plural temporary storage register sets 8 organized in sixteen groups of 64 registers each. Each group is capable of storing 64 events. Each group is organized as a first-in-first-out (FIFO) stack of registers, there being one stack, or FIFO, for each different priority level of event time-out service required by main processor 10, i.e., sixteen priorities and sixteen stacks (groups) in the present illustration. Each stack register is used to store a FIFO output word of the type illustrated in FIG. 3. Each FIFO stack also has, in another memory area, a control word, to be described, for facilitating FIFO administration; and it also has an input pointer and an output pointer through which the FIFO is accessed.

Another sector 9 of the RAM 21 includes the FIFO control words, the 16 FIFO input pointers, and the 16 FIFO output pointers which are accessed by the peripheral processor 13. The two pointers and the control word for each FIFO are adjacent memory locations followed by the sets 8 of FIFO output words. The input pointer for a certain FIFO is addressed when the peripheral processor needs to learn where to write time-out information into a FIFO register group. An output pointer for a certain FIFO is addressed when processor 13 needs to learn a location in such FIFO from which to read out information to be relayed to processor 10 via register 18 and transceiver 12.

In FIG. 2, there is shown a memory location diagram illustrating on the 16-bit word basis a timing word and a timer control word which comprise a timer register set. The timing word will contain a binary code value word indicating the number of milliseconds remaining until time-out of a particular event being timed by that register set. The value of this word is recurrently changed by the peripheral processor 13; and when the processor detects a certain value, time-out is indicated. In the timer control word, the bits 0–3 comprise the number, specified by computer 10, of one of the 16 FIFO stacks. Each stack stores time-out indications for events of a different priority. Bit 4 indicates whether the timing word is one which should be incremented or one which should be decremented. If this bit is a binary ONE, the timer is to be incremented, and the overflow to the all-ZERO condition indicates time-out. Similarly, if the bit 4 contains a ZERO, the timer is one which is to be decremented; and time-out is indicated by attainment of the all-ZERO condition. Bit 5 in FIG. 2 is reserved for future use.

Bit 6 in the FIG. 2 timer control word indicates whether the event is to be timed by the basic process time, e.g., each timer processed 1000 times per second, or by some proportionally reduced time scale, i.e., a rate specified in a separate control register loaded with a value fixed by the system user. This feature is primarily useful for music synthesizers. If the bit contains a binary ZERO, the timer is operated at the full basic clock rate; and, if ONE, the timer is operated at the specified reduced clock rate.

Bit 7 is an ENABLE interrupt bit. If it is set to ONE, data will be entered in the specific FIFO when the associated timing word has become zero, i.e., indicating that time-out has occured. The bit 7 is automatically reset to ZERO after such a time-out event.

Bits 8–15 comprise a device code and constitute a programmable value which is entered into the indicated FIFO when a time-out occurs to carry along an indication of the main processor event which is being timed. Then when the FIFO is later read, the device code is available if needed to aid computer 10 operations. The values to be set in the timing word and the timer control word are specified by main processor 10 when requesting a timing interrupt.

FIG. 3 is a diagram of the contents of one of the 64 register sets 8 of a FIFO. Two 16-bit words are included in the two registers of the set. The first word is the FIFO output word. It contains the event time-out indication and is written by peripheral processor 13 upon occurrence of a time-out. That output word includes, in bit locations $\phi$–7 the number of a timer, i.e., a register set, which has had a time-out occur. This number is obtained from a timer number counter to be described. Bits 8–15 contain the aforementioned device code. This code is transferred by the peripheral processor 13 from the timer control word to the FIFO output word when an all-ZERO output condition is detected by the processor for that particular timer and the timer control word enable bit 7 is equal to 1.

A second word of the FIG. 3 register set is the FIFO control word, and it includes a FIFO control byte of bits $\phi$–7 containing information which is unique to a particular FIFO stack of register sets. Here, bits $\phi$–3 indicate one of sixteen different FIFO priority levels which can be assigned to the FIFO. This FIFO priority must be greater than the master priority, to be mentioned, in order for an event to generate an interrupt request to the main processor 10. Bit 4 in the FIFO control byte is a NEAR FULL bit which is set to binary ONE when the FIFO is seven-eighths full, i.e., when seven-eighths of its 64 FIFO output words include queued time-out information. Otherwise, the bit 4 is in the ZERO condition. The FIFO priority bits are set to $15_8$, the second from the highest priority, when the FIFO becomes seven-eighths full. Bit 5 is the CLEAR FIFO bit, and it is set to binary ONE by direction from the main processor 10 program to disable and empty the FIFO when, e.g., it is necessary to start a new set of timing functions. When set to that condition, all events in the entire FIFO stack, as well as all event time-out indications directed to it while bit 5 is set to the ONE condition, are lost. When the FIFO is empty, processor 13 clears the FIFO FLAG bit by ANDing the FIFO control byte with octal $\phi177$ to clear its most significant bit. Bit 6 is a FIFO OVERFLOW bit which is set to the binary ONE state by peripheral processor program when the FIFO overflows, i.e., when the FIFO is full and an attempt is made to store an additional time-out event therein. The event that causes the overflow is lost, and the FIFO priority bits are set to $16_8$, the next to highest priority, when this occurs. Bit 7 is the FIFO FLAG bit, and it is set to binary ONE by peripheral processor program any time that one or more events are in the FIFO; the bit is reset to binary ZERO when the FIFO is empty.

The eight high-order bits 8–15 of the FIFO control word comprise a master control byte which is the same for all FIFO control words. These bits are not actually stored in RAM 21; they are held in various registers, to be mentioned in processor 13. In this byte the bits 8–11 contain the MASTER PRIORITY bits (register 62, FIG. 6). This MASTER PRIORITY is assigned by the main processor porgram. Any individual FIFO priority must be greater than the MASTER PRIORITY for an event to generate an interrupt request. Thus, a number zero priority effectively turns off the FIFO. Bit 12 is the STOP CLK bit (flip-flop 193, FIG. 10); and, when this bit is set to the binary ONE condition by main processor program, all timing word decrementing and incrementing are inhibited. The value of this bit is tested by the peripheral processor only at the beginning of a one-millisecond timing interval so that all timers are decremented an equal number of times. Bit 13 is the RESET bit; and, when this bit is set to the binary ONE condition by peripheral processor program on main processor request, all timer control words and FIFO output words are cleared. This bit permits the entire timer to be initialized to a predetermined condition so that the operation of individual timers can be conveniently checked. Bit 14 is the INTERRUPT ENABLE bit (flip-flop 178, FIG. 10B), and it must be set to ONE on direction of the main processor 10 to enable the generation of interrupt requests to the main processor 10. It is automatically cleared when the main processor 10 has serviced the request by reading the FIFO output word indicated in the request. Bit 15 is the MASTER FLAG bit (buffer 76 output for lead 73 in FIG. 6) and is set to the binary ONE state as long as any FIFO contains an event which is capable of generating an interrupt request. A 7-CLK212 signal is produced in processor 13 when processor 10 writes a master control byte. Processor 13 asserts the byte on the T-bus (selector 171, FIG. 10B) when processor 10 wants to read it.

The peripheral processor 13 performs the necessary processing functions to keep track of the timing of multiple events which are running at the same time. In one embodiment, an LSI-11 main processor and a special purpose microprocessor, to be defined subsequently, provide sufficiently fast real-time processing for 256 timing channels in music or communication signal processing applications. The microprocessor serves as peripheral processor and buffers the bus 11 to handle all access to RAM 21. The LSI-11 machine hardware, operation, processor, and software are described in the 1976 "Digital Microcomputer Handbook" directed to that machine and published by Digital Equipment Corp.

The basic multichannel timer algorithm for the system of FIG. 1 requires that the main processor 10 indicate, as the need arises, the duration of each interval to be timed, a device code (name of device or function which is to be timed), and a timer number. The main processor also indicates, by FIFO number, the priority with which the time-out of the interval must be served; and it specifies the timing scale, whether the timer should be incremented or decremented, and the enable bit state. Peripheral processor 13, receives the aforementioned data from the main processor 10 by way of the transceiver 12 and the input register 17. Peripheral processor 13 translates the timer number to a RAM 21 address for each new message designating an interval which is to be timed and stores the received information in the timing word and the control word for that timer.

Figure 4A:
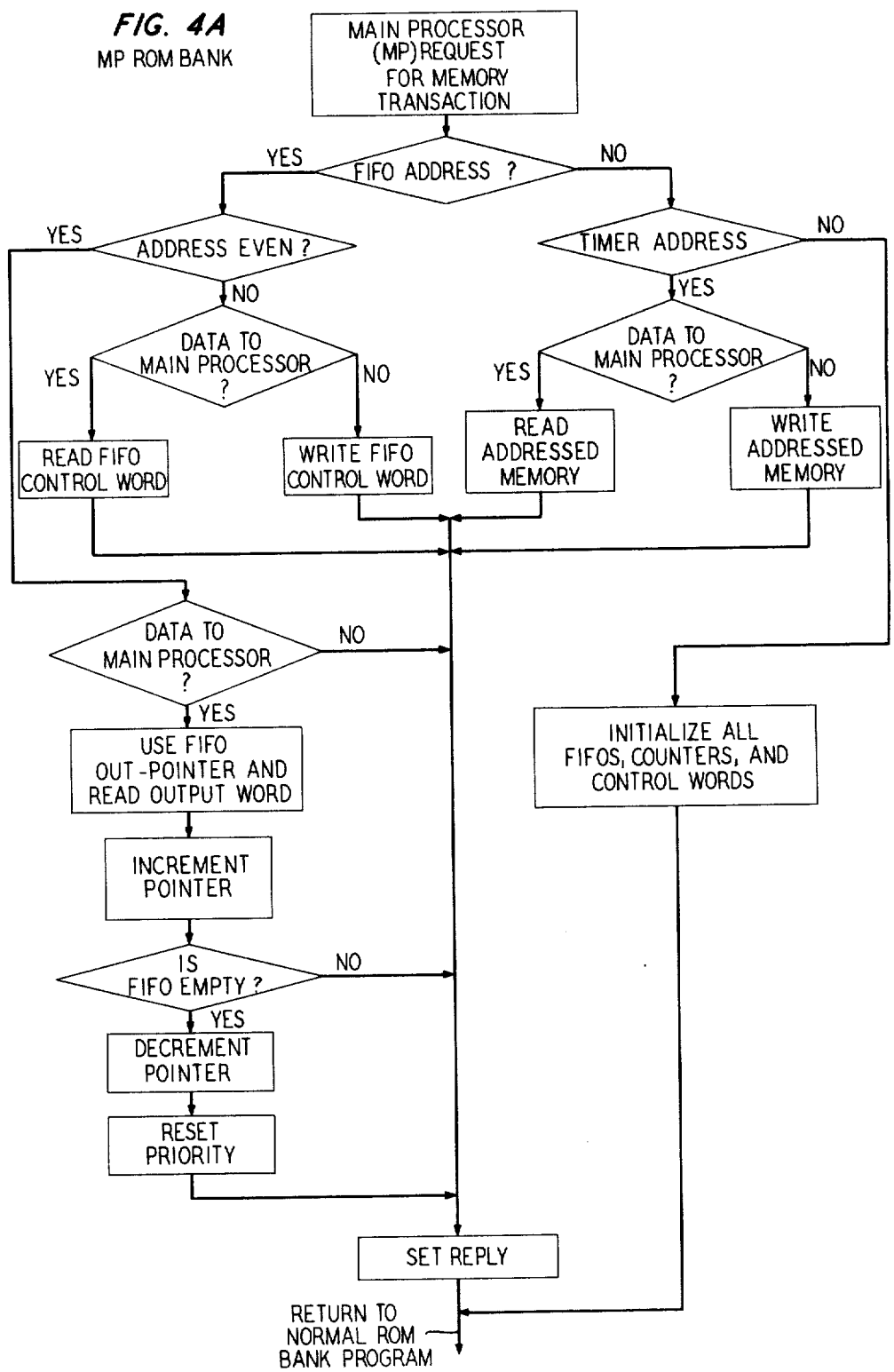
FIGS. 4A and 4B (sometimes cited generally as FIG. 4) are machine process flow diagrams illustrating the manner of operation of a peripheral processor in accordance with the present invention.
Figure 4B:
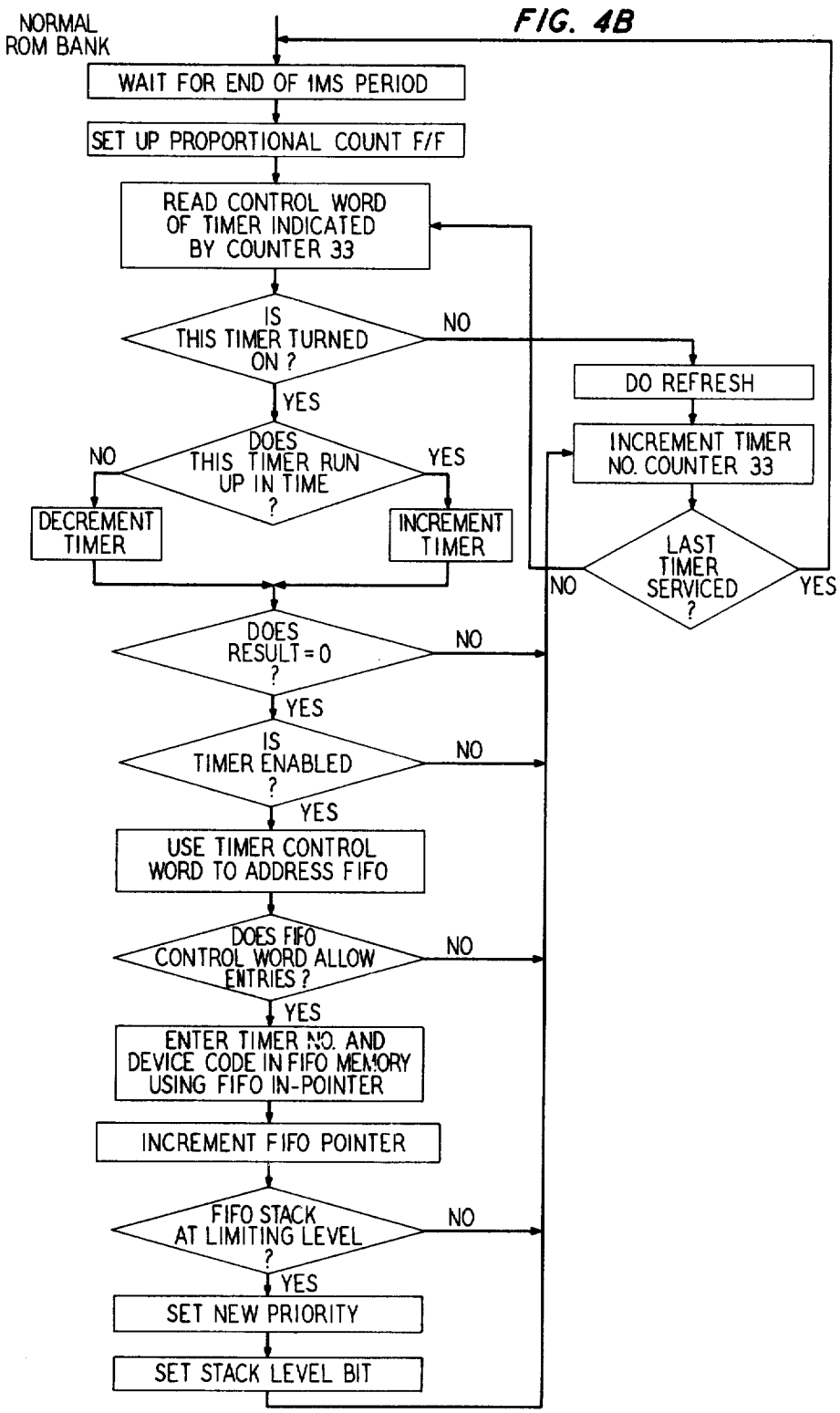

After loading the timer, the machine process followed by peripheral processor 13 is as shown in FIG. 4 and includes two principal subroutines, i.e., an MP ROM BANK routine of FIG. 4A and a NORMAL ROM BANK routine of FIG. 4B. The NORMAL routine is recurrently employed in a one-millisecond period for processing timer words, loading FIFOs when time-outs occur, and generating interrupt requests to the main processor 10. From time to time the main processor requests a peripheral processor interrupt for some memory transaction with the RAM 21, and such a request causes an interrupt of the peripheral processor's NORMAL routine, to execute the MP routine. Since only about 60% of the 1-millisecond period is needed for altering the timing words of all timers, the remainder is available for associated functions such as interrupts to communicate with processor 10. Thus, the timing accuracy, i.e., to the nearest millisecond, of the timer is not impaired by interruptions of the NORMAL routine to service the main processor memory transaction requests. A routine such as the NORMAL ROM BANK routine is advantageously arranged to allow interrupts at various points, e.g., roughly every 3-5 microseconds. Programs for the two subroutines are advantageously included in separate sections of a peripheral processor program ROM with arrangements for jumping between the two sections, or banks, as may be necessary. The two subroutines are hereinafter considered in the sequence of the NORMAL routine and then the MP routine.

In one cycle of the NORMAL ROM BANK subroutine of FIG. 4B, all timing words are processed once starting with the all-ZERO state in a timer number counter, to be described, and following an initial interval to await expiration of the current one-millisecond period before starting a new processing cycle.

At the end of that interval, a proportional count flip-flop (101 in FIG. 7A), to be described, is controlled, as determined by the FIG. 2 TIME SCALE bit, to indicate whether or not a timing rate different from the regular real-time basic clock is to be used. This feature is particularly useful in music synthesizers to allow some control of tempo. To make the feature available the user of the timer modifies program coding detail to usurp the timer No. $\phi$ timing word and timer control word storage space in RAM 21 to store binary-coded words defining a pulse rate less than the normal one-millisecond recurrence rate of the NORMAL subroutine. When a word of that timer is read in the course of the subroutine, it is treated by program as a timing rate control, rather than a timer; that is, it is then used to control a binary rate multiplier for providing output pulses at an appropriately reduced occurrence rate. Those pulses cause the incrementing or decrementing of each timer having an appropriately set TIME SCALE bit to be inhibited in a predetermined proportion of the NORMAL subroutine cycles and thereby realize the effect of running at less than a real time rate.

Regardless of whether or not proportional timing is to be employed, the processor 13 next reads the timer control word of the timer indicated by the timer counter and, except for timer No. $\phi$ in proportional counting applications, checks it to determine whether or not the timer is turned on, i.e., is TIME SCALE bit set? When, e.g., proportional timing is in effect the timer appears in certain cycles determined by other logic to be described, to be turned off; and processor 13 simply jumps to the NO branch in FIG. 4B and writes back both timer words to refresh their bit states (DO REFRESH in FIG. 4B) before incrementing the timer number counter. The contents of that timer number counter are then tested to determine whether or not the last timer in the sequence has been serviced. If the last timer has been serviced, e.g., as indicated by all-ZERO counter contents, the processor is recycled back to the beginning of the subroutine to initiate a new cycle with the step of waiting out the one-millisecond period. However, if the last timer has not been serviced, the process loops back only to read out the control word of the timer indicated by the incremented contents of the timer counter and so forth. When a timer is found, by examination of its TIME SCALE bit, to be turned on, the microprocessor further proceeds, along the YES branch in FIG. 4B, with the processing of the timing word.

Bit 4 of the timer control word is next examined to determine whether the timer is one that is to be incremented or one to be decremented. Following that determination, an appropriate change in the timer word is made, and the processor then examines the addressed timing word to determine whether or not the new value is zero, indicating that a time-out has occurred. This is achieved, for example, by testing for the all binary ZERO state. If the timing word is not zero, the processor then increments the timer number counter and, similarly, begins the examination of any next new timer in the sequence. However, if the timer word has reached the zero value, the timing word (modified nevertheless) is restored to memory; and the corresponding timer control word is read out again for guiding further processing.

In the mentioned timer control word, the ENABLE bit 7 is examined again to see whether or not the timer is enabled; that is, the bit is tested to see whether the timer is actually engaged in timing an event or whether it is a temporarily unused timer that is merely cycling freely. If the timer is cycling freely, i.e., not enabled, the process loops back to increment the timer number counter to begin examination of a new timer. However, if the timer is enabled, the FIFO number, in bits $\phi$–3 of the FIG. 2 type control word, is utilized to address the indicated FIFO control byte (FIG. 3) in RAM 21 to determine, as per FIG. 4, whether or not entries into the FIFO are allowed. The latter determination is made by examining bits 5 and 6 of the FIFO control word to see whether or not that FIFO has been cleared and whether or not it has already overflowed. If the FIFO does not allow entries, for example, if it is on the brink of overflow, the process loops back to increment the timer number counter to begin examination of a new timer word; and the timed event is lost since, when next examined in a new cycle, the timer contents will no longer equal zero. The processor 13 treats the timer as free running. A similar result would revail if the FIFO had been cleared. On the other hand, if the control word indicates that new entries are allowed, the input pointer for the FIFO register under consideration is fetched from RAM 21 and utilized, as noted in FIG. 4B, to address memory at the FIFO stack output word indicated by that pointer. In this process the number of the timer which has just timed out and the device code contained in its control word are stored in the pointed FIFO word to queue the time-out indication. The input pointer is then incremented in the next FIG. 4B step and restored to memory.

At this point, the processor 13 checks whether or not the FIFO stack contents are at one of the limiting levels. If not, it loops back to increment the timer counter; but if a limiting level has been reached, the FIFO priority is raised correspondingly, the stack level bits 4 and 6 in FIG. 3 are appropriately modified, and the process loops to increment the timer counter. More particularly, the NEAR FULL bit is tested; and, if ONE, the OVERFLOW bit is tested as noted below; but, if NEAR FULL is ZERO, a pointer comparison is initiated.

The processor determines the difference between the input and output pointers for the FIFO and compares that difference to a value, e.g., 56 for a 64-set FIFO stack, to determine whether or not the FIFO is yet seven-eighths full. If the FIFO is not yet seven-eighths full, the priority remains the same; and the timer number counter is incremented. If the FIFO is found to be at least seven-eighths full, the NEAR FULL bit is set; and the FIFO control bit priority bits $\phi$–3 are set to the priority $15_8$ in a system of different priorities ranging from $\phi$–$17_8$. Then the OVERFLOW bit is tested; and if it equals ONE, the process loops back and the timer number counter is incremented to begin examination of a new timer. If the OVERFLOW bit was not already ONE, another pointer comparison indicates whether or not it should be ONE with the new FIFO entry. If not, the process loops back, and if so the priority is raised to $16_8$, the OVERFLOW bit is set, and the process loops back.

The setting of a new priority is achieved by circuits to be described in connection with FIG. 6. Those circuits likewise make the decision as to whether or not to request an interrupt to processor 10.

Turning now to a consideration of the MP ROM BANK subroutine of FIG. 4A, the main processor (MP) 10 requests a memory transaction by sending a signal through the interface logic 16. Processor 10 also identifies the type of transaction, if data transfer is involved, by sending address and data signals through transceiver 12. The latter signals are of primary concern here and include either those which give a timer address, i.e., a time counting word and timer control word, to initiate the timing of an event or those which give a FIFO address to secure an output word readout as a prelude to servicing a time-out. The decision as to how processor 13 responds to address information from processor 10 is made by logic in FIGS. 7 and 10. The first step in the FIG. 4A MP subroutine is to identify the type of transaction required. This is done by examining the address signals received through the transceiver 12 to determine whether or not a FIFO address is given (FIADOK) and whether or not it identifies a time counting word (CWADOK). If no FIFO or counting word is identified, an initiation process (INIT) must have been requested; all timers and FIFOs are reset; and the processor resumes its NORMAL ROM BANK processing.

On the other hand, if in the FIG. 4A process a time counting word or control word is indicated, signal bits in the interface logic 16 are examined to determine whether or not data is to be transmitted to the main processor 10. If it is, e.g., for situations where it is useful to have timing data available in the processor 10 address space for diagnostics or debugging, the indicated timer address in RAM 21 is read. The resulting readout is stored in output buffer register 18, the processor sets a REPLY signal in the interface circuits 16 to advise the main processor 10 that the action sought has been completed, and peripheral processor 13 returns to NORMAL processing. Similarly, if data is not to be transmitted to the main processor, the indicated timer counter is addressed to write the timing word or control word data provided from the main processor 10 through the transceiver 12 and receive register 17. Thereafter the processor sets the REPLY signal and returns to the NORMAL ROM BANK subroutine.

Returning to the first decision point in the MP subroutine of FIG. 4A, if a FIFO address is detected, it is tested to determine whether it is an even address or an odd address. This test for even or odd address indicates whether the FIFO control word (odd address) or the next-pointed time-out word of that FIFO (even address) is to be considered. Thus, if an odd address is indicated, an interface logic circuit signal (DIN) is then utilized (selector 93 in FIG. 7A) to determine whether or not data is to be sent to the main processor 10 because that indicates whether a memory read or write operation is required. Following the indicated reading out of or writing into the appropriate word, the REPLY signal is set as the processor returns to its NORMAL subroutine.

In the case of an even FIFO address (output word), again, a determination is made as to whether or not data is to be transmitted to the main processor. If not, no data action is required; and the processor sets the REPLY signal and returns to the NORMAL subroutine. This function is provided in case the processor 10 should erroneously try to write the FIFO output; the REPLY allows processor 10 to recover from its error. However, if data is to be sent to the main processor 10, the peripheral processor 13 fetches the output pointer of the indicated FIFO, reads the pointed FIFO output word and increments the pointer. The output word thus read out is placed in the output buffer register 18. Next the FIFO is tested to determine whether or not it is empty by comparing its input and output pointers for equality by subtracting one from the other and testing the difference for zero. If the FIFO is not empty, the processor sets the REPLY signal and returns to the normal subroutine. If it is empty, the pointer is decremented to its prior value; and the processor tells the FIG. 6 priority sorting logic to reexamine and reset as necessary. Finally, the REPLY signal is set and the process returns to the NORMAL subroutine.

Figure 5:
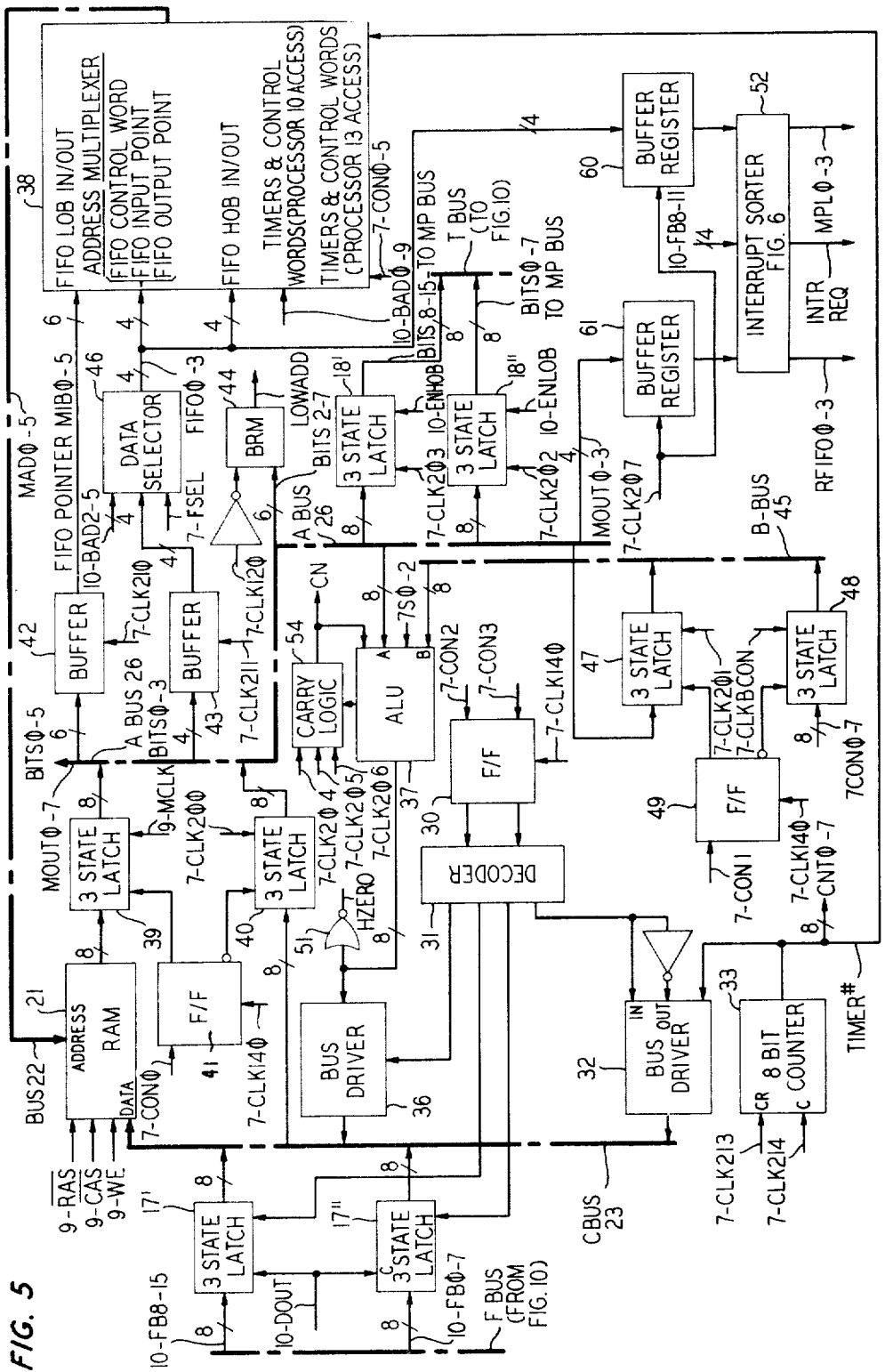
FIG. 5 is a block and line diagram of the principal data flow paths of one peripheral processor embodiment for the system of FIG. 1.

FIG. 5 illustrates the peripheral processor 13 data flow paths for the ALU and control logic part of an embodiment of the processor 13 which is suitable for operating a 256-channel timer with sufficient speed to serve an LSI-11 main processor 10. Control for the data paths is exercised primarily by a read-only memory (ROM) which will be described in connection with FIG. 7 and in which the peripheral processor program is stored for the indicated MP and NORMAL subroutines described in connection with FIG. 4. Control signals provided from the ROM and from other sources in other figures of the drawings are here, and elsewhere, when they originate in a different figure of the drawings, indicated by a two-part reference character including a number (representing the figure in which the signal originates) followed by an alphanumerical character (identifying the signal in that figure). Thus, 10-FB$\phi$-7 represents bits $\phi$-7 of the F-bus signals from FIG. 10, and 7-CLK140 represents function clock 140 from FIG. 7. In order to facilitate association of the elements of FIG. 5 with FIG. 1, it is noted that the RAM 21 is the memory 21 of FIG. 1 while the three-state latch registers 17' and 17" correspond to the input register 17 of FIG. 1. Similarly, the three-state latch registers 18' and 18" in FIG. 5 correspond to the output register 18 in FIG. 1. An address multiplexor 38 in FIG. 5 is the "RAM ADDRESS MUX - FIG. 9" block shown in FIG. 1.

The mentioned three-state latch registers are characterized by output signal states on each output lead including a low impedance binary ONE state, a low impedance binary ZERO state, and a high impedance state which is independent of binary signal state. The Ser. No. 74S374 D-type positive-edge-triggered flip-flop registers of Texas Instruments, Inc., are examples of such three-state registers.

Two bit signals 7-CON2-3 of the ROM output are loaded into a flip-flop buffer 30 upon occurrence of the 7-CLK140 signal, and a decoder 31 converts the information in those bits to a one-out-of-four-low code configuration for selecting an output from one of four input signal sources for supplying 8-bit data words on an 8-bit C-bus 23 to the data input of the RAM 21. One of these sources is a multibit bus driver circuit 32 which is provided for coupling the output of the 8-bit timer number counter 33 to the bus 23. That counter is clocked and cleared by the ROM control signals 7-CLK214 and 7-CLK213, respectively. A second source for the RAM is latch register 17" (previously loaded in response to the 10-DOUT signal) which couples the eight low-order data and address bits from the transceiver 12 of the main processor 10 in FIG. 1. Similarly, the third source for the RAM is the latch register 17' which couples the eight high-order bits from register 12. A fourth data source selectable from the decoder 31 is a multibit driver circuit 36 which couples output signals from an arithmetic-logic unit (ALU) 37 to the bus 23.

RAM 21 stores 8-bit words received from the bus 23; and, as previously noted, two word locations are required for each 16-bit timing word, timer control word, FIFO output word, and FIFO control byte. RAM 21 has 12-bit address signals supplied thereto in two 6-bit bytes for each address by way of a 6-bit address bus 22 from the output of a multiplexer 38. Intel type D2104A-2 memory modules are an example of memories that can be operated in this way. Thus, RAM 21 can store 4096 8-bit bytes of 2048 16-bit words. Multiplexor 38 is controlled by ROM output signals 7-CON$\phi$-5 for the sequential selection of RAM addresses made up of appropriate combinations of hardwired signals and process-variable signals from different sources as will be discussed in greater detail in connection with FIG. 9. For example, different sets of RAM output bits, or different sets of main processor 10 output bits, or the contents of the timer number counter 33 can be selected for application as addresses for the RAM 21. For convenience, types of RAM storage areas accessed by different inputs are indicated in the multiplexor 38.

An A-bus 26, corresponding to the receiving data bus 26 in FIG. 1, receives signals either from the RAM 21 output by way of a three-state latch register 39, or from the C-bus 23 by way of another three-state latch register 40. The registers are loaded by the 9-MCLK and 7-CLK2$\phi\phi$ signals, respectively. One or the other of the registers 39 or 40 is selected for supplying bus 26 by means of the binary signal state of a ROM output control bit 7-CON$\phi$ applied through a flip-flop circuit 41 clocked by the 7-CLK14$\phi$ signal. That flip-flop has its complimentary outputs applied to output-enabling inputs of the two registers.

Signals from the A-bus 26 are distributed to different locations by application of ROM output control signals to enable the coupling of inputs at those locations. The eight RAM output bits MOUT$\phi$-7 are generally available for use in other figures. Also bits 2-7 are applied to control the output frequency of a binary rate multiplier 44 which is clocked by the 7-CLK12$\phi$ function clock for providing a LOWADD signal. The LOWADD signal is used at selected times in connection with the aforementioned proportional counting option.

A 7-CLK21$\phi$ function clock signal couples the six bits $\phi$-5 from the A-bus 26 into a register 42 to be coupled as FIFO pointer signals by the multiplexor 38 as six loworder address bits MIB$\phi$-5 to the RAM 21. Similarly, bits $\phi$-3 from the bus 26 are coupled through a register 43, when enabled by a function clock signal 7-CLK211, to a data selector 46 as one set of four input FIFO number bits thereto. An alternate set of four input bits to the selector 46 is provided in the form of the FIFO number contained in the main processor 10 output address bits 10-BAD2-5. A 7-FSEL signal determines the selection depending upon which of the two FIG. 4 subroutines is being executed.

Still another possible input to the multiplexor 38 is the ten low-order address bits 10-BAD$\phi$-9 from the main processor to access timers and timer control words. Finally, the eight bits CNT$\phi$-7 from the output of the timer number counter 33 are also applied as another set of inputs to the multiplexor 38.

The ALU 37 in FIG. 5 receives, as an A set of eight input bits thereto, all eight bit signals from the bus 26. A second, or B, input is provided from either the bus 26 by way of a three-state latch register 47 or from the ROM outputs 7-CON$\phi$-7 by way of another three-state latch register 48. One or the other of these registers is selected by a ROM output control signal 7-CON1 state coupled through a flip-flop circuit 49 when clocked by the 7-CLK140 signal. Complimentary signals of the flip-flop provide the enabling outputs from the respective latches. Additional functional clock signals 7-CLK2φ1 and 7-CLKBCON are applied latches 47 and 48, respectively, from the ROM to enable register loading.

ALU 37 is advantageously capable of performing any one of eight different arithmetic and logic functions as directed by three bits 7-Sφ-2 of control signals. These functions advantageously include CLEAR, B−A, A−B, A+B, A OR B, A AND B, A EXOR B and PRESET. Outputs from ALU 37 are applied through an 8-bit NOR gate 51 to indicate an all-ZERO state by an HZERO signal and through the aforementioned bus driver 36 to the bus 23. Carry logic 54 is employed in conjunction with ALU 37 to enable the 8-bit ALU to do 16-bit arithmetic and in that work logic 54 supplies a carry signal CN. Circuits in logic 54 are also otherwise used to save a piece of data for use by the processor. For example, when using Texas Instruments ALU SN74S381, a corresponding look-ahead carry generator SN74S182 is responsive to ALU cascade outputs to produce a carry signal that can be stored in a flip-flop (not separately shown) if a 7-CLK2φ4 signal is present. Function clocks 7-CLK2φ5 and 7-CLK2φ6 can be used to force the flip-flop to a certain state. The Q output of the flip-flop is the CN signal which is utilized in the ALU and in the look-ahead carry generator and is also otherwise used under program control (the three mentioned function clocks) separate from ALU operation, to set the aforementioned flip-flop 101 as temporary storage in connection with scaled time functions.

An important feature of the machine process of FIG. 4 lies in keeping track of different FIFO priority levels and changing them as necessary to effect orderly administration of the FIFO register stacks. To this end priority interrupt sorting logic 52 is provided and receives FIFO number information from the output of selector 46 by way of a buffer register 60. It also receives priority designations from the A-bus 26 by way of a register 61. Both registers 60 and 61 are loaded on the 7-CLK2φ7 priority change clock signal. Master priority information is supplied from processor 10 in the F-bus bits 10-FB8-11. Sorting logic 52 uses the contents of the registers 60 and 61 as determined by the operation of the logic 52. That operation will be discussed in connection with FIG. 6 and provides RFIFOφ-3, INTREQ, and MPLφ-3 signals for use by interface logic 16 or for transmission to main processor 10.

It is apparent from the foregoing that the illustrated data paths can be selected at appropriate times to perform a variety of data processing operations. All components in FIG. 5 will be recognized as standard, commercialy available items, with the possible exception of the priority sorting logic circuit 52 which will now be discussed in greater detail in connection with FIG. 6.

Figure 6:
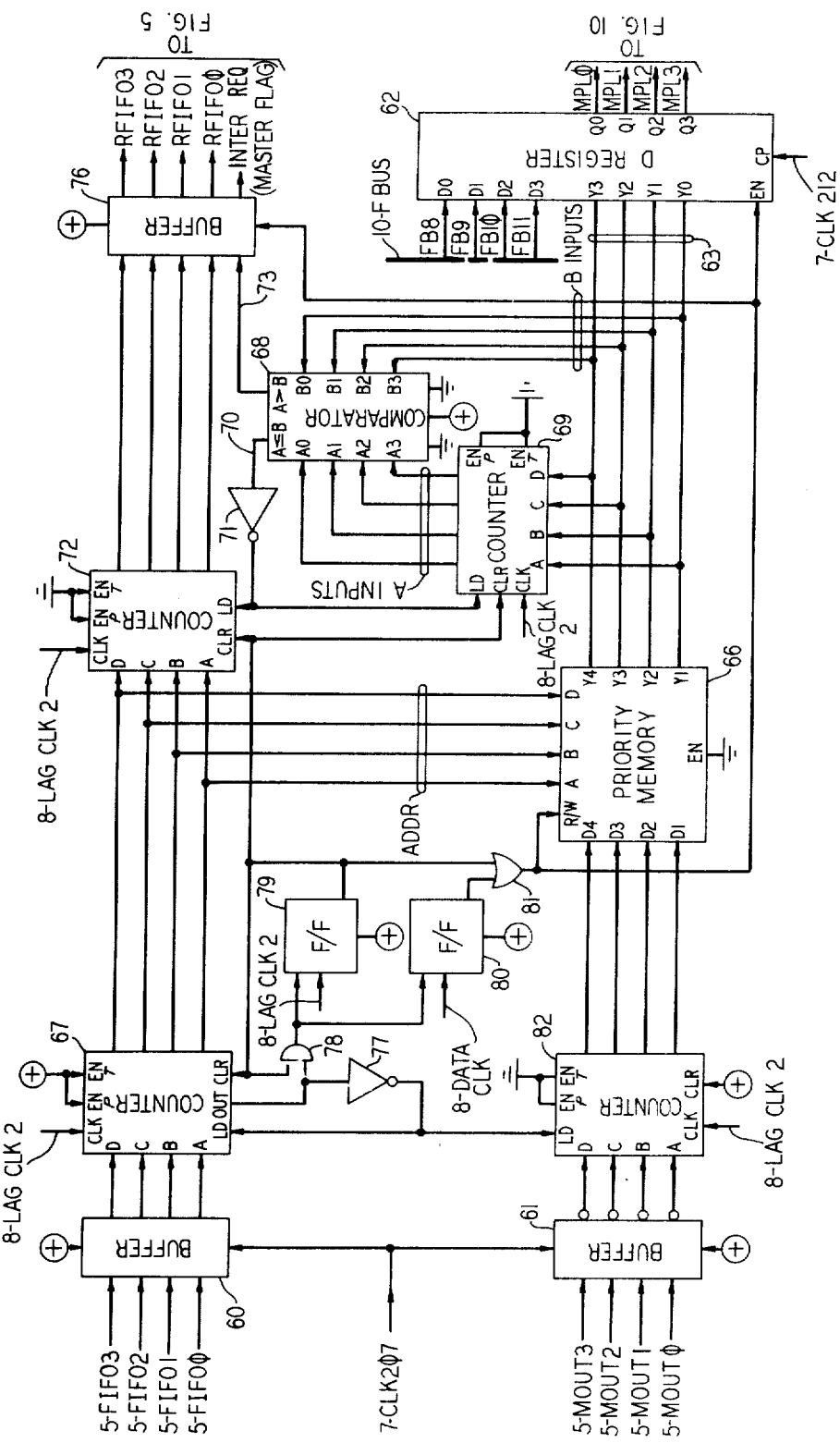
FIG. 6 is a block and line diagram of priority sorting logic utilized in the peripheral processor embodiment of FIG. 4.

FIG. 6 illustrates a logic diagram for the priority interrupt sorting logic 52 indicated in FIG. 5, and registers 60 and 61 are shown here also for convenience. A FIFO priority change can take place anytime that new data is going to be moved into the FIFO or anytime that data is read from the FIFO. That is, each appearance of the 7-CLK2φ7 control signal indicates that a priority change may have taken place and samples the FIFO and priority numbers into registers 60 and 61. Sorting logic 52 will be described in relation to the case of a timer that has reached zero and is enabled. Operation for the case of reading data from the FIFO is essentially the same. In that time-out case the FIFO number comes to register 60 from the timer control word by way of data selector 46. The priority level of that FIFO comes to register 61 from the control word of the FIFO by way of the A-bus 26. The buffer register 60 FIFO number information is also indicative of the FIFO's normal priority level, and the register 61 5-MOUTφ-3 signals indicate the current priority level of the FIFO at timeout. Master priority information contained in the 10-FB8-11 bits is stored in a register 62 and appears also as the outputs MPLφ-3 for coupling to the T-bus in FIGS. 1 and 10. This allows main processor 10 to monitor the master priority. In addition, the tristate latch nature of the register 62 is such that the same master priority information in the FB bits appears on outputs 63 when the register 62 output is further enabled by a 7-CLK212 signal as will be subsequently described.

FIFOs are initially assigned different priorities corresponding to priorities with which main processor 10 services interval time-outs. However, when the logic 52 is initialized, all FIFOs are considered to have the lowest priority until each is selected for storing an event time-out indication; and then the priority is specified to the logic 52. The FIFO priorities can be also temporarily changed to accommodate orderly FIFO administration as earlier discussed in regard to FIG. 4. Sorting logic 52 recurrently performs a counting and information comparison routine in which the respective priority levels of the sixteen FIFOs are examined during sixteen different time slots to select the one with the highest priority and during a seventeenth time slot to determine whether or not the largest is larger than the FIFO master priority. If it is larger, an interrupt request to processor 10 is generated.

A priority memory 66 stores sixteen 4-bit priority words, and its respective addresses are sequentially supplied by the four output bits of a binary counter 67 which is clocked at approximately an 18 MHz rate by a periodic LAGCLK2 signal. That counter will have been preset to a certain FIFO number by the contents of the buffer register 60 at the time of a load signal to be described. Each priority word read out of the memory 66 in this fashion is applied to the B-inputs of a comparator lcircuit 68 wherein it is compared with the last highest priority indication contained in a further counter 69 and which has its output applied to the A-inputs of the comparator 68. Counter 69 actually does no counting since it is used as a gated flip-flop latch. That is, when its load input is low it receives new input information when clocked by 8-LAGCLK2, but when the load input is high, the contents of the counter remain unchanged.

If, for any readout from memory 66, the prior highest priority indication from the counter 69 is less than or equal to that from the memory 66, an A≦B comparator output on a lead 70 (complement on lead 73) is coupled through an inverter 71 to apply a loading command signal to yet another binary counter 72 and to the counter 69. This causes the new larger priority from memory 66 to be stored in counter 69, and it simultaneously causes the corresponding then-current FIFO number from counter 67 to be stored in the counter 72. On the other hand, if the prior highest priority information in counter 69 had been larger than the new priority information at the comparator B-inputs, the contents of counters 69 and 72 are unchanged. The contents of the counter 72 and the A>B signal from comparator 68 on lead 73 are continuously applied to inputs of the buffer 76. However, the buffer register 76 contents are not overwritten with new information from counter 72 and lead 73 until the register is clocked by the aforementioned enable signal to register 62, i.e., when the master priority level signals are sampled for the compartor 68 B-inputs. Register 76 outputs are RFIFO$\phi$-3, the number of the FIFO to be read because it has the highest priority, and INT REQ signal that is sometimes also designated MASTER FLAG.

The various counters in FIG. 6 are all recurrently clocked by the clock signal LAGCLK2, but in only counter 67 is the counting effect enabled. The other counters 72 and 69 are employed as grated flip-flop latches to obtain their benefit as high speed synchronous registers. When the counter 67 is full, its overflow signal is coupled through an inverter 77 to enable a new loading of the counter; and it is also applied to an AND gate 78 in coincidence with a Q output of a flip-flop circuit 79 which is utilized to clear the counters 67, 69, and 72 on the following 8-LAGCLK2 cycle. That flip-flop circuit, and a companion flip-flop circuit 80, both receive as D-inputs thereto the output of gate 78; and they are clocked respectively by the LAGCLK2 and a periodic DATA CLOCK at the same frequency but slightly leading phase as will be described. The Q outputs of the two flip-flops 79 and 80 are coupled through an OR gate 81 to provide both a READ/WRITE control signal for the memory 66 and the aforementioned enable signal to enable the appearance of information signals at the outputs 63 and to clock the register 76 when memory 66 gets a write command.

In the clock time after counter 67 overflows, it is loaded with a FIFO number from register 60, and a further counter 82 is loaded with a priority level number from the register 61, both in response to the aforementioned overflow signal from counter 67. The output of gate 81 applied to the memory 66 causes it to have written therein the newly loaded priority information from the counter 82 at the address then indicated by the newly loaded FIFO information in counter 67. At the same time the master priority output is enabled from the register 62. The outputs 63 are now applied to the B-inputs of comparator 68 to determine whether or not the last highest FIFO priority, still in counter 69, is greater than the master priority; and the signal levels on leads 70 and 73 established accordingly.

Thus, after each overflow, counter 67 is loaded with any new FIFO information from buffer 60 to be used for as address for writing corresponding priority information into memory 66. Counter 67 is then cleared to zero and counts to fifteen and overflows again thereby scanning all FIFO priorities in memory 66 and leaving the number of the FIFO with highest priority in counter 72 and an appropriate signal on lead 73 indicating whether or not an interrupt is required.

The sorting logic operations just described continue recurrently with new FIFO and priority numbers being entered on each overflow of counter 67. As main processor 10 services time-out interrupt requests, the number of indicators stored in the highest priority FIFO is reduced, e.g., from overflow to seven-eighths full, and ultimately to empty. Processor 13 follows this in its pointer comparisons and advises processor 10 at appropriate limiting levels, as was done as the FIFO filled; and the processor 10 changes the FIFO priority correspondingly. Each change is also applied to the sorting logic 52.

Figure 7A:
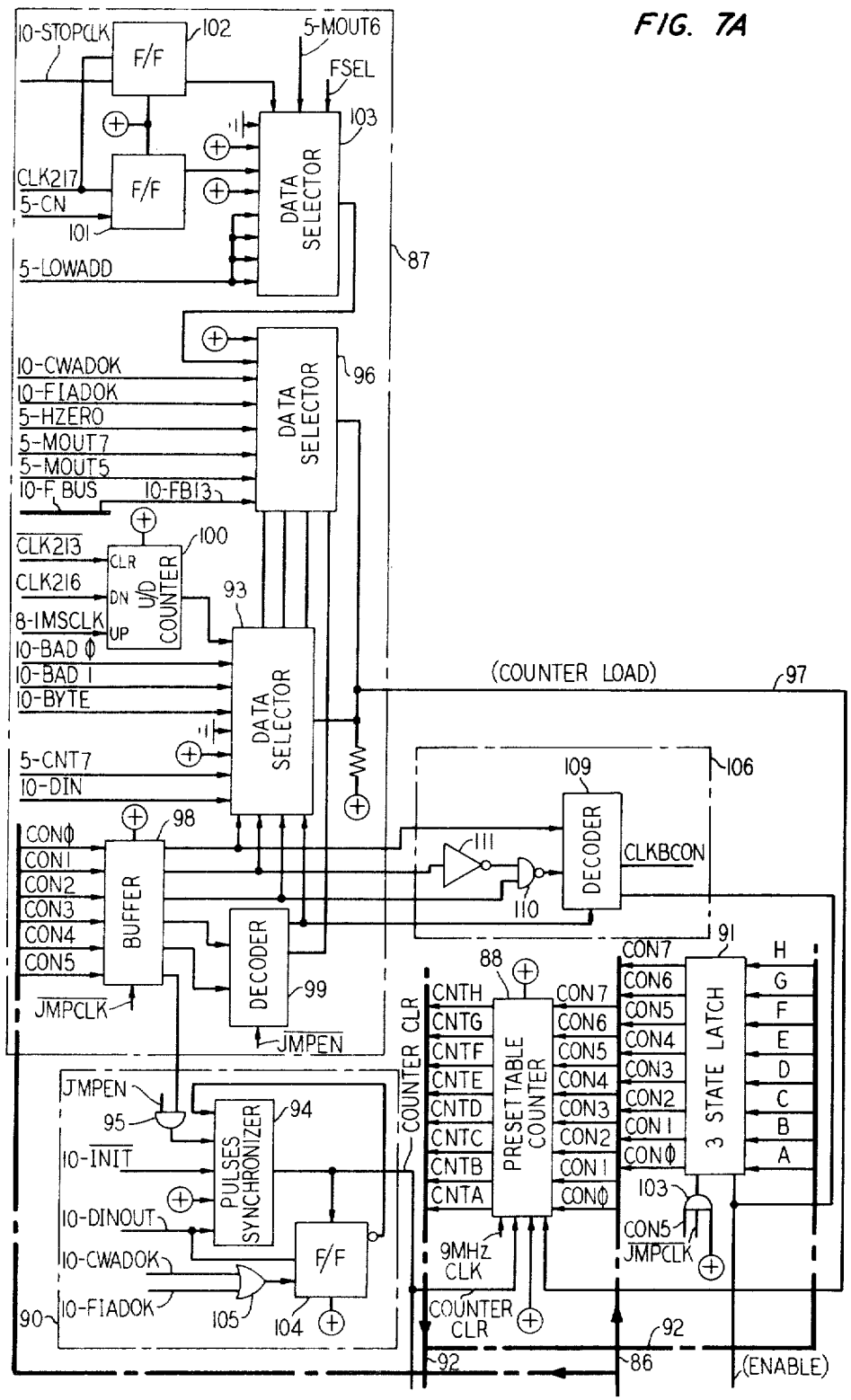
FIGS. 7A and 7B together are a block and line diagram of read-only memory (ROM) operating circuits utilized in the peripheral processor of FIG. 4.
Figure 7B:
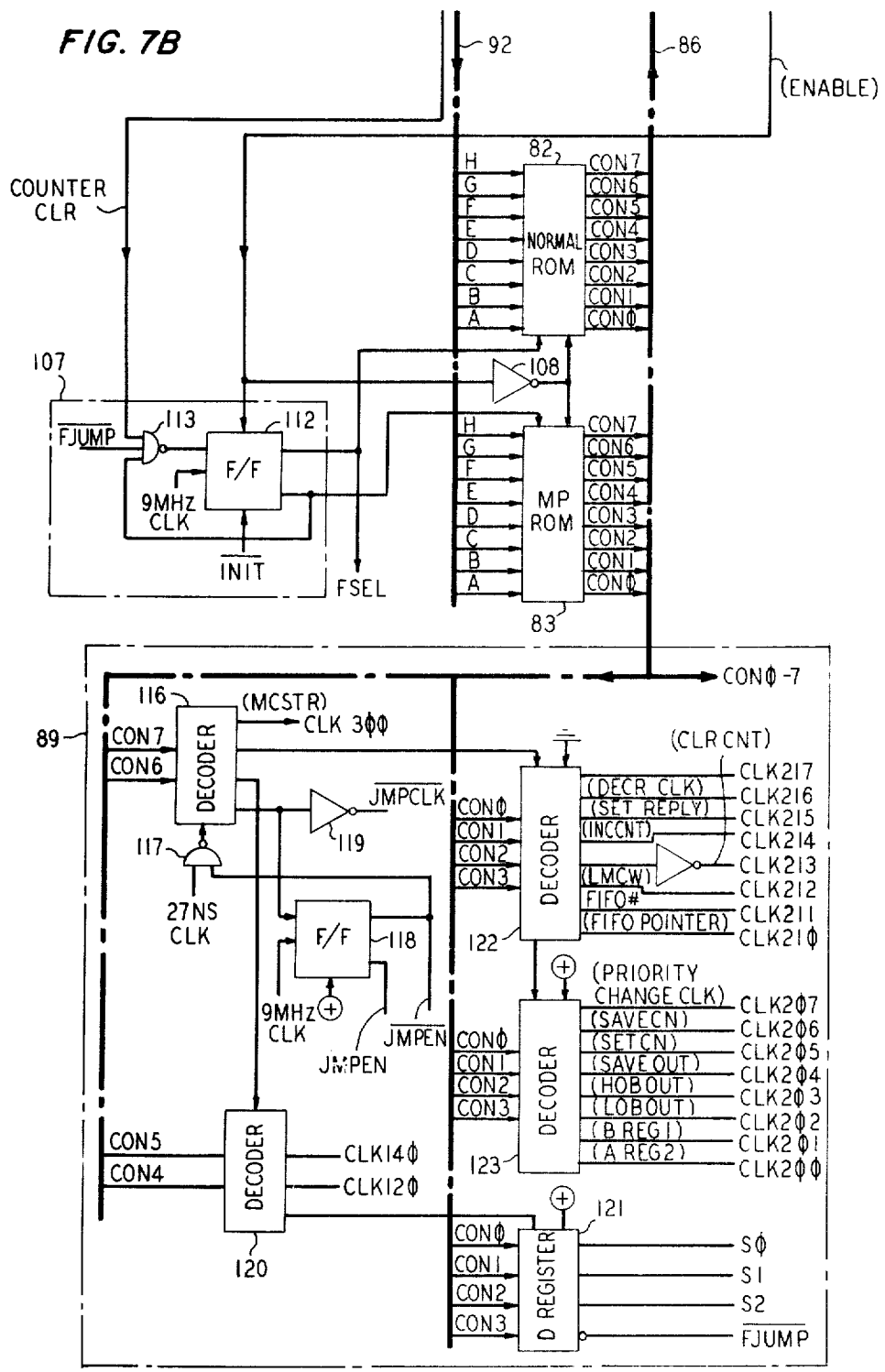

In executing the indicated timer routines of FIG. 4, one or the other of the two illustrated programs controls the peripheral processor 13. FIG. 7 is a diagram of read-only memory (ROM) logic included in that processor for providing various control outputs in response to stored instructions of a type to be described for implementing those programs. Each program is contained in a different one of a normal ROM 82 and an MP ROM 83 which are selected by logic, to be described, primarily as a function of whether or not the main processor 10 is making a memory transaction request.

Outputs from one or the other of the ROMs are applied to an output bus 86, and the bits of those output words are designated CON$\phi$-7 and used in different ways throughout the peripheral processor 13 to effect processor control. ROM output bits CON$\phi$-7 are used directly for several different purposes. One of these is to control, by the bits CON$\phi$-5, a counter loading logic circuit 87 shown in this FIG. 7. That circuit performs the data source selections that determine when to load a presettable counter 88 for effecting program jumps. ROM output bits CON$\phi$-5 are also employed to control the multiplexor 38 in FIG. 5 for selecting the RAM 21 address signal source. ROM output bits CON2 and 3 are utilized in the flip-flop circuit 30 and decoder 31 in FIG. 5 to control the selection of the RAM data input signal source. Finally, the ROM output bit CON1 is used in the selection of one of two B-input data sources for the ALU 37 in FIG. 5.

The ROM output bits are otherwise employed in function clock deriving logic 89, shown in this FIG. 7, for obtaining various individual clock or other control signals utilized throughout the peripheral processor 13 to effect the selection of data flow paths for executing various instructions in the FIG. 4 machine process. A decoder 116 is responsive to the CON6 and 7 ROM output signals on bus 86 for producing one of four outputs which have the effect of determining which of four classes of ROM output instructions is being presented for execution at any given time and correspondingly putting different portions of the bits CON$\phi$-7 to additional uses for each class. The decoder output is enabled by the output of a NAND gate 117 which receives a 27 NSCLK signal and the Q output of a flip-flop circiut 118 which will be discussed.

The number zero output of decoder 116 indicates that a JUMP instruction is present, and this output is coupled through an inverter 119 to supply the $\overline{\text{JMPCLK}}$ control signal. That same zero output of the decoder is also used as the D-input to flip-flop circuit 118 which is clocked by a 9 MHz CLK signal. The Q output of that flip-flop provides a $\overline{\text{JMPEN}}$ signal while the $\overline{\text{Q}}$ output provides the JMPEN signal.

The number one output of the decoder 116 enables the output of a decoder 120 which is responsive to the ROM outputs CON4 and 5. This enabling operation provides three different outputs depending upon the binary combination of those two ROM signals. The zero output provides clock signal to a D-type flip-flop register 121 for sampling the signal states of ROM output signals CON$\phi$-3. Q outputs of the register 121 stages which are responsive to the ROM signals CON$\phi$-2 comprise the S$\phi$-2 function clock signals which determine the particular arithmetic/logic function performed by ALU 37 in FIG. 5. The stage of register 121 which is responsive to the CON3 signal has its $\overline{\text{Q}}$ output utilized as an $\overline{\text{FJMP}}$ signal. That signal is advantageously employed for causing ROM selection logic 107, to be described, to switch to the MP ROM 83 during the NORMAL ROM BANK routine of FIG. 4. This allows utilization of excess memory space in ROM 83, in the particular memory chips employed in the illustrative embodiment, for implementing the proportional counting feature previously mentioned in connection with FIG. 4B. Two outputs of decoder 120 supply CLK120 and CLK140 signals used in various circuit locations.

An output of decoder 116 enables two further decoders 122 and 123 each to respond to the ROM output signals CON$\phi$-3 for producing eight different function clock signals of the CLK2$\phi\phi$ series. In decoder 123 the outputs Y$\phi$-7 provide CLK2$\phi\phi$ through CLK2$\phi$7 signals, respectively. Similarly, in decoder 122 the outputs Y$\phi$-7 provide the signals CLK21$\phi$ through CLK217, respectively.

Either of the ROMs 82 or 83 is addressed from the presettable counter 88 which is driven by 9 MHz periodic clock signals. That counter is initially cleared to start a particular routine by a "counter clear" signal generated by clear counter logic circuits 90 in FIG. 7. The counter 88 is then preset either from the output of a fully enabled one of the ROMs 82 or 83 by way of an extension of the bus 86 or from a three-state latch circuit 91 (when enabled). Latch circuit 91 is, in turn, loadable from the output of the counter 88 by way of a bus 92 when the latch circuit is clocked by the output of an AND gate 103 on coincidence of CON5 and $\overline{JMPCLK}$ signals.

In logic 90, a pulse synchronizer 94, e.g., the Texas Instruments Ser. No. 74120 pulse synchronizer, passes or blocks clocking output coincidence pulses from an AND gate 95 depending on the relative states of the 10-$\overline{INIT}$ signal, the $\overline{Q}$ output of a flip-flop 104, and the 10-DINOUT signals. That gate 95 is responsive to coincidence of the JMPEN signal and the CON5 signal from a register 98; both signals are determined by ROM outputs. The flip-flop 104 is clocked by the 10-DINOUT signal from main processor 10 to sample the output of an OR gate 105 that receives 10-CWADOK and 10-FIADOK interface logic 16 signals identifying the type of address signals received from processor 10. Counter clear pulses from synchronizer 94 are used to clear counter 88, and they are used in ROM selecting logic 107. The time at which the counter 88 is preset, i.e., loaded, is determined by any selectable one of many different processor functions depending upon the particular instruction being executed. Data selecting logic 87 operates through data selectors 93 and 96 to provide a binary state signal bit on a lead 97 which extends to the load control input connection of the counter 88. Data selectors 93 and 96 are multiplexor type circuits which are controlled by the ROM output bits CON$\phi$-5 applied through a buffer register 98 and a decoder 99. The buffer 98 and decoder 99 are enabled by the function clock circuit 89 output signals $\overline{JMPCLK}$ and $\overline{JMPEN}$, respectively, indicating that a jump to a nonsequential instruction address is required. Decoder 99 outputs enable outputs from either or both of selector 93 and a decoder 109 in logic 106 and of selector 96. Inputs to the data selectors 93 and 96 comprise a variety of signals from different parts of the peripheral processor 13. The sources of these input signals are indicated in the drawing and correlate with the data flow paths of FIG. 5 and the instruction set to be described.

One input connection for each data selectors 93 and 96 includes additional logic. Thus, a reversible, 4-bit, binary counter 100 supplies the number zero input for the selector 93 and is driven up by each 1 millisecond clock and down by function clock CLK216 after the end of each NORMAL ROM BANK routine (to start the "wait for end of 1 ms period" step). The counter is initially preset (by connections not shown) to the $10_8$ level at which its output to selector 93 is high. At the end of each NORMAL routine the CLK216 signal decrements the counter 100 to the $7_8$ level where it provides a low output to selector 93 while in the step "wait for end of 1 ms period." The next 1MSCLK signal increments the counter and allows a new NORMAL cycle to begin. If, due to an unusually large number of interrupts, a cycle extends for more than one millisecond, counter 100 will be stepped to $11_8$ before a CLK216 signal can decrement it. However, now the new NORMAL routine begins immediately and can, in this or a subsequent cycle, complete execution to produce a second CLK216 signal in a signal 1MSCLK interval and thereby catch up.

A pair of flip-flop circuits 101 and 102 clocked by CLK217 and a data selector 103 supply the number one input of the data selector 96. A combination of a 10-STOPCLK signal sampled by flip-flop 102, the 5-MOUT6 signal, and an FSEL signal control data selector 103 to use one of several inputs including ground, positive supply voltage, the 5-CN signal sampled by flip-flop 101, or the 5-LOWADD output of binary rate multiplier 44. That input of selector 96 is sampled to effect the "timer turned on" decision point in the FIG. 4 NORMAL suproutine.

The source from which information for the presettable counter 88 is obtained is determined by an enable logic circuit 106 which provides output enabling signals to the three-state latch 91 and, through an inverter 108, to ROMs 82 and 83. Thus, if the latch circuit 91 is not enabled, its high impedance output is ineffective to control the states of the stages of counter 88 so that when that counter receives its load signal from lead 97 its state is necessarily controlled by the ROM output provided from bus 86. On the other hand if the latch 91 output is enabled, the outputs of ROMs 82 and 83 are both disabled so that their high impedance output does not affect counter 88; and the contents of latch 91 control the state of that counter. In the enable logic 106, the number zero output of decoder 99 is employed to enable a further decoder 109 for decoding the information content of two binary-coded input signals. A first of these two signals is the CON$\phi$ output of register 98, and a second of these two signals is provided by the output of a NAND gate 110 which is responsive to the CON1 and 2 signals from buffer register 98 after inversion of the CON1 signal by an inverter 111. The number zero output of decoder 109 is the aforementioned enable signal for the circuits 91, 107, 82, and 83. In addition, the number one output of the decoder 109 comprises the CLKBCON function clock which clocks signals into latch 48 of FIG. 5.

ROM selection logic 107 includes a D-type flip-flop circuit 112 which is recurrently clocked by the 9 MHz clock signal to store the binary signal state of the output of a NAND gate 113 which is responsive to the coincidence of the counter clear signal from logic circuit 90, the $\overline{FJUMP}$ signal, and the $\overline{Q}$ output of the flip-flop. The latter flip-flop output is also applied for selectively enabling the output of MP ROM 83 for the main processor ROM BANK routine. The Q output of flip-flop 112 performs a similar function for the NORMAL ROM 82 as well as providing the FSEL function control signal that is one of the selecting inputs to selector 103.

Figure 8:
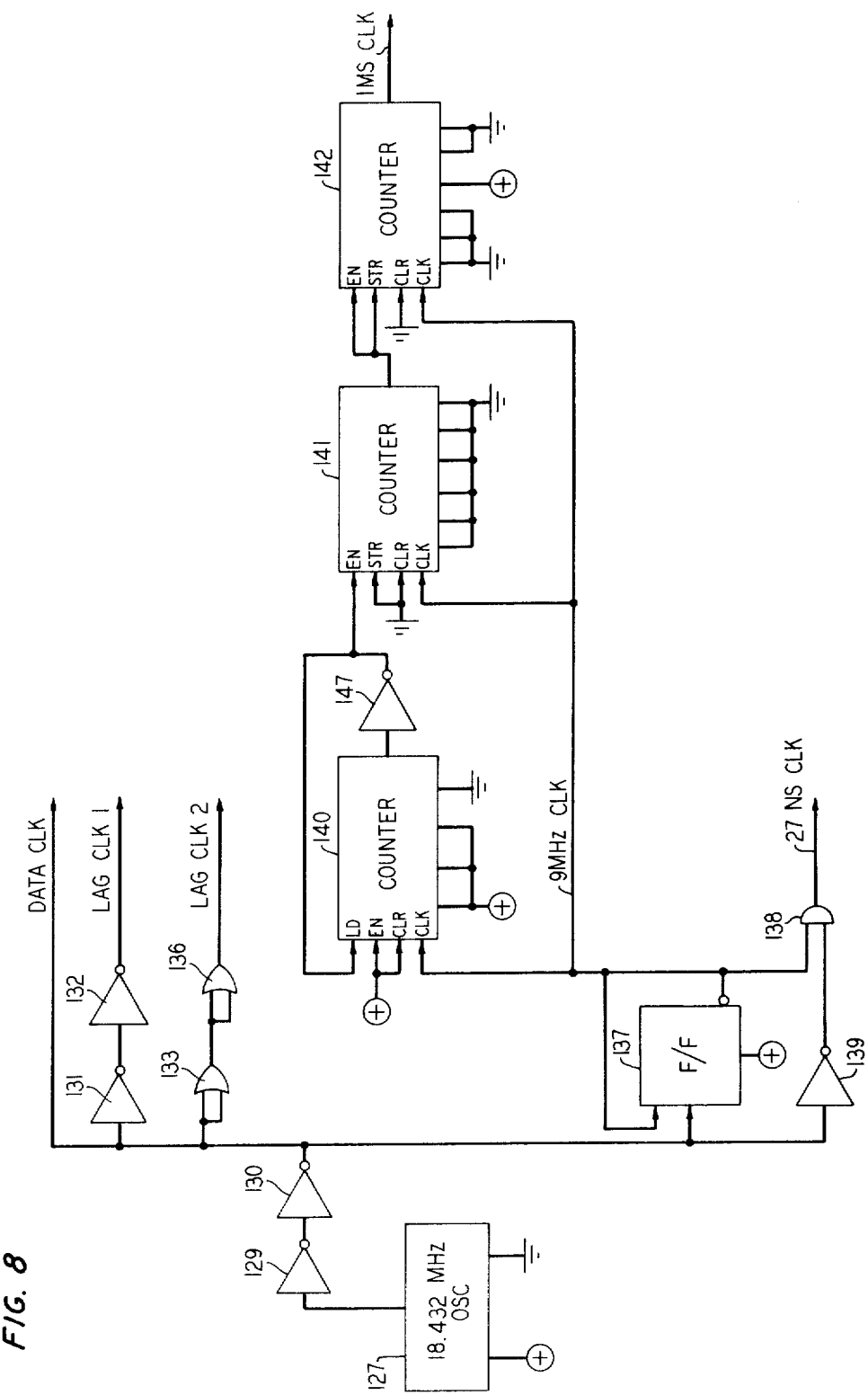
FIG. 8 is a diagram of circuits for producing periodic clock signals for the embodiment of FIG. 4.

FIG. 8 depicts an illustrative logic arrangement for deriving the various periodic clocks utilized in the peripheral processor 13. In this embodiment, an oscillator 127 provides the basic clocking information and is illustratively operated at 18.432 MHz. Four inverters 129-132 are coupled in tandem for applying the output of oscillator 127 to produce an output signal designated LAGCLK1 having a delay with respect to the output of oscillator 127 corresponding to the delay of four inverter circuits. In a similar fashion, two OR gates 133 and 136, each having its inputs tied together, are connected in tandem to the output of inverter 130 to provide the LAGCLK2 clock signal with a longer delay. The output of inverter 130 is also utilized directly as a DATACLK signal, and it is further applied as the clocking input to a flip-flop circuit 137. That flip-flop circuit has its $\overline{Q}$ output utilized to provide the 9 MHzCLK signal and to provide the D-input to the flip-flop 137. In addition, the $\overline{Q}$ output of flip-flop circuit 137 is applied to an AND gate 138 along with the output of inverter 130, after coupling through a further inverter 139, to supply a 27NSCLK signal, i.e., 27 nanosecond-pulses occurring at the 9 MHz rate.

The 9 MHzCLK signal is also employed to clock three additional binary counters 140, 141, and 142 of the presettable variety for counting down the 9 MHzCLK to provide the 1MSCLK from the output of the third counter 142. The counter 140 starts from the binary 111$\phi$ state as determined by fixed bias bit-parallel inputs; and, upon attaining full count, its output is inverted in an inverting circuit 147 to enable a reloading of the counter 140 and to enable the loading of counter 141 to the all-ZERO state. The output of the latter counter is similarly employed upon overflow to enable the setting of counter 142 to the binary 000100 state.

FIG. 9 depicts details of the FIG. 5 RAM address multiplexor 38. In the illustrative embodiment of FIG. 9, six data selectors 150-155 are provided. Each selector has eight selectable data inputs so that the overall multiplexor has eight choices for six of the RAM address bits designated MAD$\phi$-5 and which appear on the memory address bus 22. Since RAM 21 uses two 6-bit bytes for each address, the multiplexor provides four different full addresses. Two byte-input gating signals $\overline{RAS}$ and $\overline{CAS}$ and a WE write enable signal for RAM 21 are also generated in circuits shown in this FIG. 9.

The address information for timer timing words and timer control words can come either from main processor 10 or from within peripheral processor 13. In the latter case, one byte includes two ROM control bits 7-CON2,3 for timer byte selection and the timer counter bits 5-CNT$\phi$-3 toward timer selection; and the second byte includes counter bits 5CNT4-7 further toward timer selection and two bits of hard wired ground, which thereby fix the section of RAM that is addressed. Address signals from processor 10 include in the first byte the same two ROM control bits plus the bits 10-BAD1-5, and the second byte includes bits 10-BAD6-9 and the two ground bits.

FIFO storage is accessed from within processor 13 by a first byte including the ROM control bit 7-CON2 for selecting output word byte and five of the FIFO pointer bits 5-MIB$\phi$-4. The second byte includes the additional pointer bit 5-MIB5, the FIFO number bits 5-FIFO$\phi$-3, and a hard wired high signal for RAM sector selection.

Finally, FIFO pointers are stored in a separate RAM location for each FIFO, and one byte each for each of the input and output pointers. These address signals include two ROM control bits 7-CON2,3 for input/output selection and four FIFO number bits 5-FIFO$\phi$-3 for a first byte and six hard wired bits (ground for bits MAD$\phi$-3,5 and high for MAD4) for the second byte.

The multiplexor data selectors are controlled, in part, by ROM output bits CON$\phi$-1 applied by way of a buffer register 149. The ROM output bits CON2-3 supplied from that register provide direct data inputs to selectors 150 and 151 for cetain of the multiplexor input data options as already outlined. Finally, the ROM output bits CON4-5 from register 149 comprise two of eight address input signals to a programmable ROM 157; and those two bits determine whether the RAM 21 access is to read out, write in, or read and then write at the same address. ROM 157 is further addressed by four output bits from a counter 158. That counter is cleared by the 7-CLK300 function clock at the same time that the same signal clocks input signals to buffer register 149. Counter 158 is driven by the LAGCLK1 signal for providing the required sequence of RAM 21 control signals $\overline{RAS}$, $\overline{CAS}$, and WE as well as the MCLK signal for controlling the RAM output register 39.

ROM 157 has four output bits which are applied through a buffer register 159 that is periodically clocked by the same clock driving the counter 158 to produce various output signals. The first two outputs of register 159 are coupled through a decoder 160. The number one output is coupled back to enable counting in the counter 158. Outputs 2 and 3 of decoder 160 provide the MCLK signal and the WE signal. The second two outputs of the register 159 provide the $\overline{CAS}$ and the $\overline{RAS}$ address bits, respectively, for RAM 21. In addition, the third output of ROM 157 is coupled through an inverter 161 to provide the third selection control input bit for the data selectors 150-155.

FIG. 10 shows illustrative details of one embodiment of the interface logic 16 in FIG. 1. Also shown in FIG. 10B is the bus transceiver 12 and the associated F-bus, for signals passing from the main processor 10 toward the peripheral processor 13, and the T-bus, for signals similarly transmitted to the main processor 10. The transceiver 12 is normally enabled for transmission from processor 10 to the F-bus. However, upon application of an inverse enabling signal, to be described, the transceiver couples signals in the opposite direction from the T-bus.

Figure 10A:
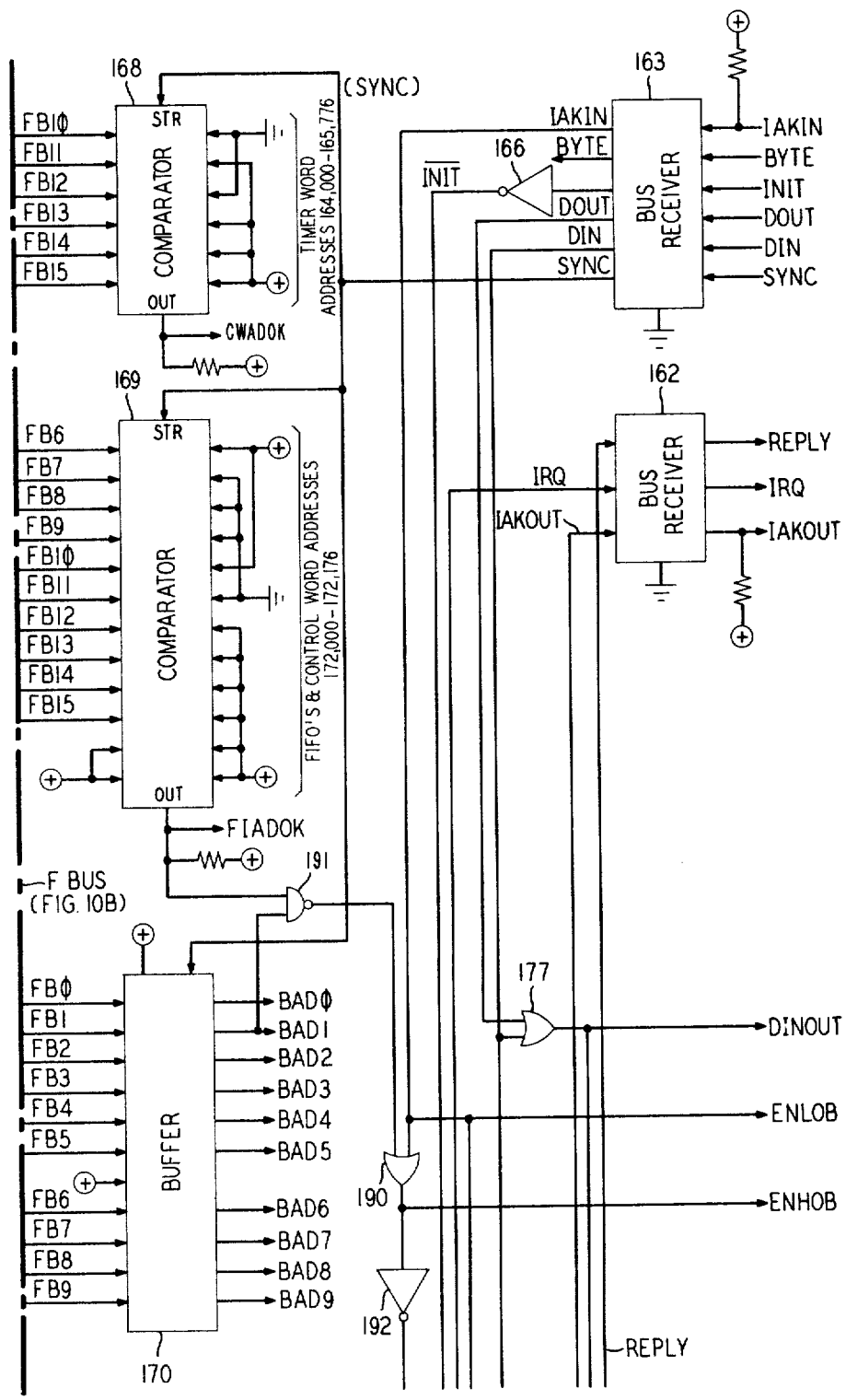

Three direct signal communication lines are provided for interface from the peripheral processor 13 to the main processor 10 by way of a bus receiver 162 in FIG. 10A. These signals include an IAKOUT signal which is sent by peripheral processor 13 in a polling pass-control operation initiated by the main processor 10 to find out which of its various peripheral units (only processor 13 being shown) made a request for an interrupt. Another signal is the IRQ signal which is a request from the peripheral processor for an interrupt in the main processor to service a function time-out. The third signal is REPLY, and it is the one supplied by the peripheral processor 13 to indicate to the main processor 10 that its most recent memory transaction request has been serviced by the peripheral processor, as indicated for the ending of the MP ROM BANK routine in FIG. 4.

Six further control signal paths are provided through a bus receiver 163 for signals from the main processor 10 to the peripheral processor 13. These include an IAKIN signal which is the input signal to processor 13 in the aforementioned pass control operation. A second control signal is the BYTE signal indicating that a byte transfer is going to be made via transciever 12, and the ONE or ZERO state of the DAL$\phi$ bit to the transceiver indicates whether the high-order or low-order byte, respectively, of the word will be transferred. A third control signal is INIT which is coupled through an inverter 166 to supply the $\overline{\text{INIT}}$ signal. The next two control signals DOUT and DIN indicate whether the main processor 10 is requesting data to be transmitted out to it or advising that data will be transmitted in from it to the peripheral processor 13. A final control signal is the SYNC signal to be used in a manner to be indicated. A NAND gate 167 in FIG. 10B responds to a coincidence of the REPLY and DIN signals to enable the transceiver 12 for coupling signals to the main processor 10.

Comparison circuits 168 and 169 in FIG. 10A are strobed by the SYNC signal from bus receiver 163 to respond to different bit groups of signals on the F-bus for indicating the presence of a timing counter word address or a FIFO or FIFO control word address. Upon detection of a timing counter address, comparator 168 produces a CWADOK signal. Similarly, comparator 169 produces the FIADOK signal upon recognizing a FIFO address. Also a buffer register 170 is enabled by the SYNC signal to respond to the F-bus signal bits FB$\phi$-9 for storing the information which they represent for subsequent use in the peripheral processor 13 as the binary address bits BAD$\phi$-9. These bits are utilized primarily as selectable addresses at the address multiplexor 38 for addressing timing words and timer control words and FIFOs in RAM 21.

Outgoing signals to processor 10 on the T-bus are coupled through a data selector 171 in FIG. 10B and a bus driver 172. In the selector 171 the circuits are responsive to a pair of control signals, to be described, for selecting signals at either a first or a second set of inputs. Selection of the first inputs transmits an interrupt request in the form of the 6-INTER REQ signal and the master priority bits 6-MPL$\phi$-3 from the priority sorting logic 52. Also at the first inputs are the STOPCLK control signal and an INTERRUPT EN control signal. Selection of the second inputs occurs on the IAKIN signal from processor 10 acknowledging the interrupt request and transmits a hard wired portion of FIFO addresses in the processor 10 address format. The bus driver 172 provides the remaining part of the FIFO address indication in signals 6-RFIFO$\phi$-3.

The remainder of the interface control signal developing logic shown in FIG. 10 falls into three main function groups which are partly interrelated. The first group includes a NAND-gate flip-flop circuit 173 which is utilized to produce the aforementioned REPLY signal. This flip-flop is set either on the occurrence of the negative-going edge of the 7-CLK215 signal on coincidence of high states of the IAKIN signal, the IRQ signal, and the DIN signal to activate a NAND gate 176. Flip-flop 173 is reset by the negative-going portion of the DINOUT control signal which is provided by the output of an OR gate 177 that is responsive to the aforementioned DIN and DOUT control signals.

The second function group of logic circuits generates the IRQ and IAKOUT control signals by use of the F-bus bit FB14 and the function clock 7-CLK212 as well as employing two presettable D flip-flop circuits 178 and 179. Upon occurrence of 7-CLK212 indicating whether or not the FIFO master control byte is being accessed, an inverter 184 enables gates 181 and 183 to sample bit FB14, and the inverted bit from 182 to set or clear flip-flop 178 which provides the interrupt enable signal to an AND gate 180. That gate responds to the coincidence of the high INTERRUPT EN signal, $\overline{\text{IAKIN}}$ signal, and 6-INTERREQ signal to set a flip-flop 179 for producing the IRQ signal for transmission to processor 10 via bus receiver 162. An $\overline{\text{IRQ}}$ signal from the flip-flop 179 clears flip-flop 178. The output of gate 183 is also coupled through AND gate 186 with the $\overline{\text{INIT}}$ signal to be ANDed in a gate 187 with the output of NAND gate 176 for forcing the flip-flop 179 to the set state. The IAKOUT signal is generated by AND gate 188 upon coincidence of $\overline{\text{REPLY}}$, $\overline{\text{IRQ}}$, and IAKIN signals.

Finally, the third function portion of the interface logic circuits generates control signals for the outgoing data selector 171 and the bus driver 172 as well as certain other control signals. To this end the IAKIN signal is coupled through an inverter 189 to become the $\overline{\text{IAKIN}}$ signal. IAKIN is also distributed as the ENLOB control signal, and it provides one input to an OR gate 190 which is responsive to either that signal or the output of an NAND gate 191 for producing the ENHOB control signal. ENLOB and ENAHOB are used in FIG. 5 for selecting the register 18" and 18'. Gate 191 responds to the coincidence of the FIADOK signal indicating that a FIFO address has been recognized, and the BAD1 address bit indicating that a FIFO control word is being accessed. An inverter 192 couples the output of OR gate 190 to enable readout from data selector 171 while the IAKIN signal state is used to determine which input will be selected for loading in that data selector. The F-bus bit FB12 provides the data input to a D-flip-flop circuit 193 which is clocked by the clock 7-CLK212 for producing the aforementioned STOPCLK signal.

An illustrative instruction set for operating peripheral processor 13 in accordance with the machine process outlined in FIG. 4 and the data paths illustrated in FIG. 5 will now be described. All instructions are eight bits wide and bits 6 and 7 are decoded by the FIG. 7 decoder 116 into four major groups which determine how all eight bits will be otherwise interpreted. It is apparent in FIG. 7 that each bit can be used in at least two ways at once, i.e., both in the logic 89 and in the CON outputs. Instructions are referenced in terms of their respective three octal-value digits, and the four groups are:

0XX—Jump type instructions. Always a two-word instruction with the second word treated as either an optional transfer address or data.
1XX—ALU bus and function control instructions.
2XX—Instructions for generating clock pulses used for various functions.
3XX—Memory transfer instructions.

Bits in an instruction are labeled $b_0$ (LSB) through $b_7$ (MSB) (corresponding to CON$\phi$-7 in FIG. 7) in the following instruction descriptions.

JUMP TYPE INSTRUCTIONS 0XX

These instructions test the state of a signal and may cause the presettable program counter 88 in FIG. 7 to be loaded with the value word immediately following the first word of the instruction. That word following a jump instruction is never interpreted as an instruction per se.

Interrupts from the main processor (MP) 10 (a request for a memory transaction) may be serviced at only the time of a jump instruction, i.e., at a decision point or when looping or when passing between routines in the FIG. 4 flow diagram. If $b_5$ is set in the jump instruction, then the interrupt request will be serviced by forcing a jump to the initial step of the MP ROM BANK subroutine. Bit 5 is CON5 at buffer 98 in FIG. 7. The current program address (i.e., the address of the jump instruction that allowed the interrupt) is saved in FIG. 7 register 91 to be used later for return from interrupt. If $b_5$ is ZERO, no interrupt will be allowed.

$b_0$, $b_1$, $b_2$, and $b_3$ select 16 varieties of the jump instruction. In the list that follows, $b_5$ may be set in any of the instructions to allow interrupts from the main processor 10. For the commercial processor of one embodiment, the program must be written to allow such interrupts at least once every 5 μsec. to avoid an appearance to that processor of faulty operation.

010—Unconditional jump
011—This is a complex instruction that tests a variety of conditions
  (1) If it occurs in the MP ROM BANK subroutine, then JUMP IF BUS ADDRESS $\phi$ is =0. (This bit state indicates high or low order byte in a write byte instruction.)
  (2) If it occurs in the NORMAL ROM BANK subroutine, JUMP IF TIMING WORD SHOULD NOT BE MODIFIED (otherwise it may be incremented or decremented). The decision is based on the states of three logic signals:
    (1) If the FIFO master control word "stop clocks" bit 12 is set, then jump (i.e., all clocks are off).
    (2) $b_6$ of the timer control word is tested; and, if set, the timer is a "proportional time" timer and may not have to be modified each 1 ms time period. If $b_6$ is set, the proportional time flag (flip-flop 101 in FIG. 2) is also tested; and if that flag is not set, then a jump is executed.
    (3) Otherwise, a jump is not executed.
012—JUMP IF MP IS ADDRESSING A TIMING WORD OR ITS CONTROL WORD (10-CWADOK)
013—JUMP IF MP IS ADDRESSING A FIFO OUTPUT WORD OR ITS CONTROL WORD (10-FIADOK)
014—JUMP IF ALU RESULT IS ZERO (5-HZERO)
015—JUMP IF BIT 7 OF THE DATA WORD FROM MEMORY IS HIGH (5-MOUT7). Bit 7 in, e.g., a timer control word indicats whether or not timer is enabled.
016—JUMP IF BIT 5 OF THE DATA WORD FROM MEMORY IS HIGH (5-MOUT5). Bit 5 in, e.g., a FIFO control word indicates whether or not the FIFO has been cleared.
017—JUMP IF BIT 13 OF THE DATA FROM THE MP IS HIGH (10-FB13). This permits testing 10-FB13 to determine whether or not a master reset should be performed.
000—JUMP IF 1 MSEC CLOCK HAS NOT TICKED (reversible counter 100)
001—JUMP IF BIT 1 OF ADDRESS FROM THE MP IS LOW (10-BAD1)
002—JUMP IF BIT 2 OF ADDRESS FROM THE MP IS LOW (10-BAD2)
003—JUMP IF BYTE TRANSFER REQUEST FROM MP IS LOW (10-BYTE)
004—RETURN FROM INTERRUPT (Circuit 106 in FIG. 7). This is like an unconditional jump, but the transfer address is the address of the last jump instruction before the interrupt was granted.
005—LOAD B2 REGISTER (48) WITH DATA THAT FOLLOWS. This is really an unconditional don't jump where the unused transfer address is used as the data to load in the B2 register.
006—JUMP IF THE MOST SIGNIFICANT BIT OF THE TIMER NUMBER IS LOW (5-CNT7).
007—JUMP IF THE MP "DIN" SIGNAL IS LOW (10-DIN).

ALU & BUS CONTROL INSTRUCTIONS 1XX

There are two basic subtypes:
10X SET ALU FUNCTION (7-S$\phi$-2)
  100 FORCE ALU OUTPUT TO ZERO (CLEAR)
  101—B−A
  102—A−B
  103—A+B
  104—A EXCLUSIVE OR WITH B
  105—A OR B
  106—A AND B
  107—FORCE ALU OUTPUT TO ALL 1's (PRESET)
140+XX SELECT (7-CLK140 plus 7-CON2-3) REGISTERS ASSERTED on A, B, & C BUSES (26, 45, & 23)
  0—ASSERT A1(39) ON ABUS
  1—ASSERT A2(40) ON ABUS
  0—ASSERT B1(47) ON BBUS
  2—ASSERT B2(48) ON BBUS
  0—ASSERT ALU OUTPUT (36) ON CBUS
  4—ASSERT LOB FROM MP (17″) ON CBUS
  10—ASSERT HOB FROM MP (17′) ON CBUS
  14—ASSERT TIMER COUNTER NUMBER (32) ON CBUS

FUNCTION CLOCK INSTRUCTIONS 2XX

200—Load Register A2 (40) with data on C-BUS
201—Load Register B2 (47)
202—Load Register (18″) LOB to MP
203—Load Register (18′) HOB to MP
204—Save ALU carry (CN) output (54)
205—Set ALU carry (CN) input (54)
206—Clear ALU carry (CN) input (54)
207—Move data to clock interrupt sorter (Priority change CLK)
210—Load FIFO pointer register (42)
211—Load FIFO # register (43)
212—Load FIFO master control byte register (62, 178, 193) from data on
MP input BUS (1MCW)
231—Clear Timer number counter (33)
214—Increment timer number counter (33)
215—Set REPLY Back to MP (173)
216—Decrement 1 ms. tick counter (100)

The tick counter 100 is automatically incremented by the 8-1MSCLK signal to start processing of all 256 timers. When finished, the program decrements the tick counter by CLK216.

217 Load the proportional time flag (101). The STOPCLK flag (192) is also loaded at this time.

MEMORY TRANSFER INSTRUCTIONS 3XX

All memory instructions move data to or from the RAM 21. Data to the memory is asserted on the C-bus 23 by some previous instruction. Data from the memory goes into the A1 register 39. The complete operation code is formed by combining the separate bit fields:

3XX—Memory Instruction ($b_6$ & $b_7$)

Type of transfer

There are three types of transfer specified by 7-CON4-5 (bits $b_4$ and $b_5$) as to RAM 21. These include writing data into memory (20), reading data out of memory (00), and a read-all-to-write instruction (40). In the latter instruction the readout is operated upon in the ALU and the results immediately written back at the same address. That type of operation is convenient for high speed incrementing and decrementing of a timer timing word in an interval of three clock periods. Of course the increment value must have been set up by prior instruction so that it also is available to the ALU at the correct time.

MEMORY ADDRESS

The following are illustrative addresses specified by 7-CON$\phi$-3 ($b_0$, $b_1$, $b_2$, $b_3$) to be combined with the foregoing type-of-transfer bits:

0—FIFO low order byte (LOB)
1—FIFO input pointer
2—timing word location LOB group
3—Processor 13 supplied address for LOB
4—FIFO HOB
5—FIFO output pointer
6—Timing word location HOB
7—Processor 13 supplied address for HOB
10—(Reserved)
11—FIFO control byte (in FIFO control word only LOB group of interest because master control byte of FIG. 3 actually appears in various registers as already noted.)
12—timer control word (LOB group)
13—(Reserved)
14—(Reserved)
15—FIFO temporary pointer (a location for storing a return pointer 10 if processor 13 requires memory access while processor 13 is transferring data from a time-out timer to a FIFO.)
16—Timer control word (HOB group, device code)
17—(Reserved)

By combining 300 with the type-of-transfer control bit combination of $b_4$-$b_5$ (7-CON4-5) and one of the foregoing memory address selection control bit combinations $b_0$-$b_3$ (7-CON$\phi$-3), all the allowed memory transfer instructions are formed. In all cases, of course, the appropriate data sources and destinations involved in a memory transfer are established using previously executed instructions.

Although the present invention has been described in connection with particular embodiments and applications thereof, additional embodiments, applications, and modifications which will be obvious to those skilled in the art are included within the spirit and scope of the invention.

I claim:

1. A method in a multifunction timer for a communication system main processor (10) in which timer respective interval-defining data words are stored in an addressable memory (21) having a plurality of timer register sets (7) and a plurality of temporary storage register sets (8), and the words are recurrently and sequentially processed to time the intervals by a peripheral processor (13) coupled for accessing said memory and coupled for communicating with said main processor, the method comprising the steps of recurrently and sequentially processing data words in said timer register sets, respectively, to effect respective time interval measurements, entering into one of said timer register sets information provided from said main processor to initiate an interval measurement, storing in one of said temporary storage register sets an indication of the timing out of the last mentioned interval in accordance with said recurrent processing of a corresponding data word, and providing to said main processor said timing out indications one at a time.

2. The method in accordance with claim 1 in which said main processor is a stored program controlled processor having in its program a plurality of functions to be timed for different interval durations, each of which functions has one of predetermined different priorities with which the functions are to be serviced after the end of the respective interval, said temporary storage register sets comprise a plurality of groups (#0-#15 in 8) of registers, each group corresponding to a different one of said priorities, and in which said storing step stores said time-out indication in one of said registers of the one of said groups corresponding to the priority of the function for which the interval was measured, and said providing step provides said time-out indications one by one from the group of highest priority of all groups having time-out indications stored therein.

3. The method in accordance with claim 2 in which said providing step supplies said indications from said one group on a first-in-first-out basis.

4. The method in accordance with claim 1 in which said entering step comprises writing in one of said timer register sets a timing word (FIG. 2) having a binary coded interval duration value and an associated device name word (FIG. 2) identifying a function being timed, both of said words having been received from said main processor, said processing step further comprises recurrently altering (FIG. 4B—increment timer) said timing word value in a predetermined direction for each of said time words in a fixed recurring sequence of timing words, and detecting (FIG. 4B—does result=0?) attainment in a timing word of a predetermined value indicating time-out for the function indicated by said associated device name, said storing step further comprises sending to said one temporary register set (FIG. 4B—enter timer No. and . . . ), as an indication of said time-out from said processing step, said associated device name and a coded value signal naming the one of the said timer register sets in which said associated device had been timed, and said providing step further comprises transmitting to said main processor (FIG. 4A) an indication of the location in said temporary register sets at which said time-out indication is stored.

5. The method in accordance with claim 4 in which said temporary storage register sets comprise a plurality of groups (#0-#15) of registers, each group corresponding to a different one of said priorities, and in which said storing step stores said time-out indication in one of said registers of the one of said groups corresponding to the priority of the function for which the interval was measured, and said providing step provides (FIG. 4A—Timer address branch) said time-out indications one by one, on a first-in-first-out basis, from the group of highest priority of all groups having time-out indications stored therein.

6. A multifunction timer for a communication system main processor (10) in which timer respective interval-defining data words are recurrently and sequentially processed to time the intervals, the improvement comprising an addressable memory (21) having a plurality of timer register sets (7) and a plurality of temporary storage register sets (8), a peripheral processor (13) coupled for accessing said memory and coupled for communicating with said main processor, said peripheral processor comprising means for recurrently and sequentially processing data words in said timer register sets, respectively, to effect respective time interval measurements, means, responsive to a main processor interrupt request, for receiving an interval duration data word to initiate an interval measurement in one of said timer register sets, and means for storing in one of said temporary storage register sets an indication of the timing out of the last-mentioned interval by said recurrent processing of the corresponding data word, means for sending (179) to said main processor an interrupt request to serve the oldest timing out indication in said temporary storage register sets, and means, responsive to a main processor interrupt request, for sending (173) to said main processor an interrupt request to collect said oldest timing out indication.

7. The timer in accordance with claim 6 in which said peripheral processor includes means (127) for clocking said peripheral processor at a first predetermined rate, means in said timer register sets (timer #0 of 7) for defining a reduced clock rate, and means (101, 44) operative in each recurrence of the sequential processing, for selecting for each timer register set either said predetermined rate or said reduced rate for such recurrence.

8. The timer in accordance with claim 6 in which said peripheral processor includes priority sorting logic (52) for determining whether or not a temporary storage register group priority is the highest priority and is higher than a master priority, said logic comprising means for storing (66) the current priority of each group, means for recurrently scanning (67) the addresses of said current priority storing means to read the contents thereof, means for comparing (68) each new priority output of said priority storing means with a last highest priority value and substituting (71) the new priority for the last highest if the new is larger, means, operative at the end of each scanning recurrence, for (a) writing (81, 82) a new priority value into said priority storing means at a then currently addressed location, and (b) simultaneously comparing (62, 69) said master priority to the last highest priority and producing (73, 76) an interrupt request signal if the latter priority is higher.

9. In a multifunction timer for recurrently processing plural data words to measure respective plural time intervals the improvement comprising a random access memory (21) having a data input bus (23), the data output bus (26), and an n-bit address bus (22) for accessing $2^{2n}$ word locations in such memory, means for supplying (17) to said input bus timing request information, means for receiving (18) from said output bus time-out service request information, means for controllably multiplexing (38) onto said address bus signals from plural different locations in said timer, an arithmetic logic unit (37) coupled for controllably operating on signals from said output bus to provide signals to said input bus, a read-only memory (82,83) for storing sets of instruction signals for controlling said timer in accordance with a multifunction timing algorithm (FIGS. 4A and 4B) in which coded value signals in multiple predetermined word locations in said random access memory are recurrently and sequentially altered to measure different time intervals and to queue time-out indications and provide corresponding time-out service request signals, means for substantially periodically accessing (88) said read-only memory in a controllably variable sequence of the address locations thereof, and means for coupling (leads CON0-7) outputs of said read-only memory to at least said multiplexing means and said arithmetic/logic unit to effect control thereof.

10. The timer in accordance with claim 9 in which separate memory banks, a first (82) of said banks including means for storing signals controlling said timer in accordance with said algorithm, and a second (83) of said banks including means responsive to said request signals controlling said timer in accordance with an algorithm for responding to said timing request information, and said coupling means includes means (107), responsive to outputs of said read-only memory, for switching timer control between said memory banks.

11. The timer in accordance with claim 9 in which said coupling means includes means (121), responsive to a predetermined subgroup of signals in at least a portion of said sets of signals at said read-only memory outputs, for separately decoding said subgroup of signals for selecting arithmetic logic unit operations from a predetermined set of such operations.

12. The timer in accordance with claim 9 in which said periodic accessing means comprises a clocked, presettable, program counter (88) coupled to provide address signals to said read-only memory, a latch register (91) coupled to receive selectable outputs of said counter in parallel with said read-only memory, means for selectably loading (87) said counter to preset the contents thereof either from said read-only memory outputs or from said latch register, and said loading means includes means, responsive to outputs of said read-only memory, for selecting signals from predetermined different parts of said timer for controlling times for actuating said loading means.

* * * * *